United States Patent [19]

Holloway et al.

[11] Patent Number: 4,922,414
[45] Date of Patent: May 1, 1990

[54] SYMBOLIC LANGUAGE DATA PROCESSING SYSTEM

[75] Inventors: John T. Holloway, Belmont; David A. Moon, Cambridge; Howard I. Cannon, Lexington; Thomas F. Knight; Bruce E. Edwards, both of Belmont; Daniel L. Weinreb, Somerville, all of Mass.

[73] Assignee: Symbolics Inc., Cambridge, Mass.

[21] Appl. No.: 78,724

[22] Filed: Sep. 8, 1987

Related U.S. Application Data

[62] Division of Ser. No. 450,600, Dec. 17, 1982.

[51] Int. Cl.[5] .............................................. G06F 9/00
[52] U.S. Cl. .................. 364/200; 364/255.1; 364/255.2; 364/255.3; 364/255.4; 364/255.5; 364/255.7; 364/255.8
[58] Field of Search ... 364/200 MS File, 900 MS File

[56] References Cited

U.S. PATENT DOCUMENTS 4,587,610  3/1986  Rodman ............................ 364/200
4,680,700  7/1987  Hester et al. ...................... 364/200
4,682,281  7/1987  Woffinden et al. ................ 364/200
4,730,249  3/1988  O'Quin II, et al. ................ 364/200

Primary Examiner—Gareth D. Shaw
Assistant Examiner—John G. Mills
Attorney, Agent, or Firm—Sprung Horn Kramer & Woods

[57] ABSTRACT

A symbolic language data processing system comprises a sequencer unit, a data path unit, a memory control unit, a front-end processor, an I/O and a main memory connected on a common Lbus to which other peripherals and data units can be connected for intercommunication. The system architecture includes a novel bus network, a synergistic combination of the Lbus, microtasking, centralized error correction circuitry and a synchronous pipelined memory including processor mediated direct memory access, stack cache windows with two segment addressing, a page hash table and page hash table cache, garbage collection and pointer control, a close connection of the macrocode and microcode which enables one to take interrupts in and out of the macrocode instruction sequences, parallel data type checking with tagged architecture, procedure call and microcode support, a generic bus and a unique instruction set to support symbolic language processing.

6 Claims, 22 Drawing Sheets

SYMBOLIC LANGUAGE DATA PROCESSING SYSTEM

This is a division of application Ser. No. 450,600, filed Dec. 17, 1982, now abandoned.

BACKGROUND OF THE INVENTION

The present invention relates to a data processing system which is programmable in a symbolic processing language, in particular LISP.

LISP is a computer programming language which originated as a tool to facilitate Artificial Intelligence research. Artificial Intelligence is a branch of computer science that seeks to understand and model intelligent behavior with the aid of computers. Intelligent behavior involves thinking about objects in the environment, how objects relates to each other, and the properties and uses of such objects. LISP is designed to facilitate the representation of arbitrary objects and relationships among them. This design is to be contrasted with that of other languages, such as FORTRAN, which are designed to facilitate computations of the values of algebraic formulae, or COBOL, which is designed to facilitate processing the books and records of businesses.

The acronym "LISP" stands for "List Processing Language", as it was dubbed when Professor John McCarthy of MIT (now of Standford University) invented LISP in the 1950's. At that time, the notion of representing data objects and complex relations between them by "lists" of storage locations was novel. LISP's motion of "object" has been incorporated into many subsequent languages (e.g., SIMULA 67), but management believes that LISP and the languages derived from it are the first choice of Artificial Intelligence researchers all over the world.

LISP also facilitates the modeling of procedural knowledge (i.e., "how to do something" as opposed to "what something is"). All procedural knowledge is expressed as "functions", computational entities which "know how" to perform some specific action or computation upon supplied objects.

Although the text of LISP functions can be from one line to several thousand lines long, the language imposes no penalty for dividing a program into dozens of hundreds of functions, each one the "expert" in some specific task. Thus, LISP facilitates "modularity", the clean division of a program into unique areas of responsibility, with well-defined interaction. The last twenty years of experience in the computer science community has established the importance of modularity for correct program operation, maintenance and intelligibility.

LISP also features "extensible syntax or notation". This means that language constructs are not limited to those supplied, but can include new constructs, defined by the programmer, which are relevant to the problem at hand. Defining new language constructs does not involve modification of the supplied software, or expertise in its internal detals, but is a standard feature of the language available to the applications (and systems) programmer, within the grasp of every beginner. Through this feature, LISP can incorporate new developments in computer science.

LISP frees programmers from the responsibility for the detailed management of memory in the computer. The common FORTRAN and PL/I decisions of how big to make a given array or block of memory have no place in LISP. Although it is possible to construct fixed-size arrays, LISP excels in providing facilities to represent arbitrary-size objects, sets of unlimited numbers of elements, objects concerning which the number of details or parameters is totally unknown, and so forth. Antiquated complaints of computers about fixed-size data stores ("ERROR, 100 INPUT ITEMS EXCEEDED") are eliminated in systems written in LISP.

LISP provides an "interactive environment", in which all data (knowledge about what things are and how they are) and functions (knowledge about how to do things) co-exist. Data and functions may be inspected or modified by a person developing a program. When an error is discovered in some function or data object, this error may be corrected, and the correction tested, without the need for a new "run". Correction of the error and trial of the repair may sometimes be accomplished in three keystrokes and two seconds of real time. It is LISP's notion of an interactive environment which allows both novices and experts to develop massive systems a layer at a time. It has been observed that LISP experts enter programs directly without need for "coding sheets" or "job decks"; the program is written, entered, and debugged as one operation. Functions can be tested as they are written and problems functions can be tested as they are written and problems found. The computer becomes an active participant in program development, not an adversary. Programs developed in this way build themselves from the ground up with solid foundations. Because of these features, LISP program development is very rapid.

LISP offers a unique blend of expressive power and development power. Current applications of LISP span a broad range from computer-aided design systems to medical diagnosis and geophysical analysis for oil exploration. Common to these applications is a requirement for rapidly constructing large temporary data structures and applying procedures to such structures (a data structure is complex configuration of computer memory representing or modeling an object of interest). The power of LISP is vital for such applications.

Researchers at the M.I.T. Artificial Intelligence Laboratory initiated a LISP Machine project in 1974 which was aimed at developing a state-of-the-art personal computer design to support programmers developing complex software systems and in which all of the system software would be written in LISP.

The first stage of the project, was a simulator for a LISP machine written on a timeshared computer system. The first generation LISP machine, the CONS, was running in 1976 and a second generation LISP Machine called the CADR incorporated some hardware improvements and was introduced in 1978, replacing the CONS. Software development for LISP machines has been ongoing since 1975. A third generation LISP machine, the LM-2 was introduced in 1980 by Symbolics, Inc.

The main disadvantages of the aforementioned prior art LISP machines and of symbolic language data processing systems in general, is that the computer hardware architecture used in these systems was originally designed for the more traditional software languages such as FORTRAN, COBAL, etc. As a result, while these systems were programmable in symbolic languages such as LISP, the efficiency and speed thereof were considerably reduced due to the inherent aspects of symbolic processing language as explained hereinbefore.

SUMMARY OF THE INVENTION

The main object of the present invention is to eliminate the disadvantages of the prior art data processing systems which are programmable in symbolic languages and to provide a data processing system whose hardware is particularly designed to be programmable in symbolic languages so as to be able to carry out data processing with an efficiency and speed heretofore unattainable.

This and other objects are achieved by the system according to the present invention which is preferably programmable in symbolic languages and most advantageously in Zetalisp which is a high performance LISP dialect and which is also programmable in the other traditional languages such as FORTRAN, COBAL etc.

The system has many features that make it ideally suited to executing large programs which need high-speed object-oriented symbolic computation. Because the system hardware and firmware were designed in parallel, the basic (macro)instruction set of the system in very close to pure Lisp. Many Zetalisp instructions execute in one microcycle. This means that programs written in Zetalisp on the system execute at near the clock rate of the processor.

The present invention is not simply a speeded-up version of the older Lisp machines. The system features an entirely new design which results in a processor which is extremely fast, but also reboust and reliable. This is accomplished through a myriad of automatic checks for which there is no user overhead.

The system processor architecture is radically different from that of conventional systems and the features of the processor architecture include the following:

- Microprogrammed processor designed for Zetalisp
- 32-bit data paths
- Automatic type-checking in hardware
- Full-paging 256 Mword (1 GByte) virtual memory
- Stack-oriented architecture
- Large, high-speed stack buffer with hardware stack pointers
- Fast instruction fetch unit
- Efficient hardware-assisted garbage-collection
- Microtasking
- 5 Mwords/sec data transfer rate The system according to the present invention comprises a sequencer unit, a data path unit, a memory control unit, a front-end processor, an I/O and a main memory connected to a common Lbus to which other peripherals and data units can be connected for intercommunication. The circuitry present in these aforementioned elements and the firmware contained therein achieved the objects of the present invention. In particular, the novel areas of the system include the Lbus, the synergistic combination of the L-bus, microtasking, centralized error correction circuitry and a synchronous pipelined memory including processor mediated direct memory access, stack cache windows with two segment addressing, a page hash table and page hash table cache, garbage collection and pointer control, a close connection of the macrocode and microcode which enables one to take interrupts in and out of the macrocode instruction sequences, parallel data type checking with tagged architecture, procedure call and microcode support, a generic bus and a unique instruction set to support symbolic language processing.

The stack caching feature of the present invention is carried out in the memory controller which comprises means for effecting storage of data of at least one set of contiguous main memory addresses in a buffer memory which stores data of at least one set of contiguous main memory addresses and is accessible at a higher speed than the main memory. The memory controller also comprises means for identifying those contiguous addresses in main memory for which data is stored in the buffer memory and means receptive of the memory addresses for directly going to the buffer memory and not through the main memory when the identifying means identifies the address as being in the set of contiguous addresses or for going directly to the main memory and not through the buffer memory when the identifying means idenifies the address as not being in the set of contiguous memory addresses.

The central processor of the system which operates on data and produces memory addresses, has means for producing a given memory address corresponding to a base pointer and a selected offset from the base pointer and means for arithmetically combining the given address and offset prior to applying same to the address means. Further, the central processing means produces the base pointer and offset in one timing cycle and arithmetically combines the base pointer and offset in the same timing cycle in a preferred manner by providing a arithmetic logic unit which is dedicated solely to this function.

Moreover, the addressing means advantageously comprises means for converting the addresses from the cpu to physical locations in main memory by using the same circuitry as the identifying means.

Further, in order to more efficiently carry out these functions, the cpu has means for liming the offset from the base pointer to within a preselected range and for insuring that the arithmetic combination of the base pointer and offset fall within at least one set of memory addresses. This is advantageously carried out in the compiler which compiles the symbolic processing language into sequences of macrocode instructions.

The parallel data type checking and tagged architecture is achieved by providing the main memory with the ability to store data objects, each having an identifying type field. Means are provided for separating the type field from the remainder of each data object prior to the operation on the data object by the cpu. In parallel with the operation on the data object, means are provided for checking the separated type field with respect to the operation on the remainder of the associated data object and for generating a new type field in accordance with that operation. Means thereafter combine the new type field with the results of the operation. This system particularly advantageously executes each operation on the data object in a predetermined timing cycle and the separating means, checking means and combining means act to separate, check and combine the new type field within the same timing cycle as that of the operation. The system also is provided with means for interrupting the operation of the data processor in response to the predetermined type field that is generated to go into a trap if the type field that is generated is in error or needs to be altered, and for resuming the operation of the data processor upon alteration of the type field.

The page hash table feature is carried out in the system wherein the main memory has each location defined by a multi-bit actual address comprising a page number and an offset number. The cpu operates on data and stores data in the main memory with an associated virtual address comprising a virtual page number and an offset number. The page hash table feature is used to convert the virtual address to the actual address and comprises means for performing a first hash function on the virtual page number to reduce the number of bits thereof to form a map address corresponding to the hashed virtual page number, at least one addressable map converter for storing the actual page number and the virtual page number corresponding thereto in the map address corresponding to the hashed virtual page number and means for comparing the virtual page number with the virtual page number accessed by the map address whereby a favorable comparison indicates that the stored actual page number is in the map converter. Means are also provided for performing a second hash function on the virtual page number in parallel with that of first hash function and conversion and means for applying the accessed actual page number and the original offset number to the main memory when there is a favorable comparison and for applying the second hashed virtual page number to the main memory when the comparison is unfavorable.

In a particularly advantageous embodiment, the converting means comprises at least two addressable map converters each receptive of the map address corresponding to the first hashed virtual page number and means responsive to an unfavorable comparison from all converters for writing the virtual page number and actual page number at the map address in the least recently used of the at least two map converters.

In the event that the first and second hashed addresses do not locate the address, the main memory has means defining a page hashed table therein addressable by the second hashed virtual page number and a secondary table for addresses. The cpu is responsive to macrocode instructions for executing at least one microcode instruction, each within one timing cycle and wherein the converting means comprises means responsive to the failure to locate the physical address in the page hash table for producing a microcode controlled lookup of the address in the secondary table.

A further back-up comprises a secondary storage device, for example a disk and wherein the main memory includes a third table of addresses and the secondary storage device includes a fourth table of addresses. The converting means has means responsive to the failure to locate the address in the secondary table for producing a macrocode controlled look-up of the address in the third table of main memory and then the fourth table if not in the third table, or indicating an error if it is not in the secondary storage device. Another feature provides means for entering the address in all of the tables where the address was not located.

The hardware support for the key feature of the close interrelationship between the microcode and macrocode comprises an improvement in the cpu wherein means are provided for defining a predetermined set of exceptional data processor conditions and for detecting the occurrence of these conditions during the execution of sequences of macrocode instructions. Means are responsive to the detection of one of the conditions for retaining a selected portion of the state of the data processor at the detection to permit the data processor to be restarted to complete the pending sequence of macrocode instructions upon the removal of the detected condition. Means are also provided for initiating a predetermined sequence of macrocode instructions for the detected condition to remove the detected condition and restore the data processor to the pending sequence of macrocode instructions. In a particularly advantageous embodiment, the means for initiating comprises means for manipulating the retained state of the data processor to remove the detected condition and means for regenerating the nonretained portion of the state of the data processor.

The cpu has means for executing each macrocode instruction by at least one microcode instruction and the means defining the set of conditions and for detecting same comprises means controlled by microcode instructions. Moreover, the means for retaining the state of the data processor comprises means controlled by microcode instructions and the means for initiating the predetermined sequence of macrocode instructions comprises means controlled by microcode instructions.

Another important feature of the present invention is the unique and synergistic combination of the Lbus, the microtasking, the synchronized pipelined memory and the centralized error correction circuitry. This combination is carried out in the system according to the present invention with a cpu which executes operations on data in predetermined timing cycles which is synchronous with the operation of the memory and at least one peripheral device connected on the Lbus. The main memory has means for initiating a new memory access in each timing cycle to pipeline data therein and thereout and the cpu further comprises means for storing microcode instruction task sequences and for executing a microcode instruction in each timing cycle and means for interrupting a task sequence with another task sequence in response to a predetermined system condition and for resuming the interrupted task sequence when the condition is removed. The Lbus is a multiconductor bidirectional bus which interconnects the memory, cpu and peripherals in parallel and a single centralized error correction circuit is shared by the memory, cpu and peripherals. Means are provided for controlling data transfers on the bus in synchronism with the system timing cycles to define a first timing mode for communication between the memory and cpu through the centrallized error correction circuit and a second timing mode for communication between the peripheral device and the cpu and thereafter the main memory through the centrallized error correction circuit. In accordance with this combination of features, data is stored in main memory from a peripheral and data is removed from main memory for the peripheral at a predetermined location which is based upon the identification of the peripheral device. Moreover, the cpu has means for altering the state of the peripheral device from which data is received, depending upon the state of the system.

The feature of the generic bus is provided to enable the system according to the present invention, having the cpu in main memory connected by a common system bus to which input and output devices are connectable, to communicate with other peripherals and computer systems on a second bus which is configured to be generic by providing first interfacing means for converting data and control signals between the system bus and the generic bus formats to effect transmission between the system bus and the generic bus and second interfacing means connected to the generic bus for converting data and control signals between the generic bus and a selected external bus format to permit data and control signal transmissions between the system bus and the peripherals of the selected external bus type. A key feature of this generic bus is that the first interfacing means converts data and control signals independently of the external bus that is selected. Thus the first interfacing means includes means for converting the control signals and address of an external bus peripheral from the system bus format to the generic bus format independently of the control signal and address format of the external bus.

The pointer control and garbage collection feature associated therewith is carried by means for dividing the main memory into predetermined regions, means for locating data objects in the regions and means for producing a table of action codes, each corresponding to one region. A generated address is then applied to the table in parallel with the operation on that address to obtain the action code associated therewith and means are provided which are responsive to the action code for determining, in parallel with the operation on the address, if an action is to be taken. In a particular advantageous embodiment, the action code is obtained and the response thereto is determined within the same timing cycle as that of the operation on the address. This is done by controlling the determining means by microcode instructions.

The cpu includes means for executing a sequence of macrocode and microcode instruction sequences to effect garbage collection in the system by determining areas of memory to be garbage collected and wherein the means for producing the action code table produces one action code which initiates the garbage collection sequences. In accordance with the invention, the garbage collection is effected by means for examining the data object at a generated address to see if it was moved to a new address, means for moving the data object to a new address in a new region if it was not moved, means for updating the data object at the generated address to indicate that it was moved, and means for changing the generated address to a new address if and when the data object is moved and for effecting continuation of the operation on the data object of the generated address.

The system according to the present invention provides hardware support for garbage collection which enables it to carry out this garbage collection sequence in a particularly efficient manner by dividing the main memory into pages and providing storage means having at least one bit associated with each page of memory. The given address is thereafter located in a region of memory and means are provided for entering a code in the at least one bit for a given page in parallel with the locating of the address in a region of memory to indicate whether an address therein is in a selected set of regions in memory.

This means for entering the code comprises means for producing a table of action codes each corresponding to one region of memory. An address is applied to the table and parallel with the locating thereof and means are provided for determining if the address is in one of the selected set of regions in response to its associated action code. The garbage collection is effected in the set of memory regions by reviewing each page and means sense the at least one bit for each memory page to enable the reviewing means to skip that page when the code is not entered therein.

The bus system in accordance with the present invention is another feature of the present invention which, in the context of the system according to the present invention includes the data processor alone, the data processor in combination with peripherals and peripheral units which have the means for communicating with the data processor on the Lbus. The data processor includes bus control means for effecting all transactions on the bus in synchronism with the data processor system clock and with a timing scheme including a request cycle comprising one clock period wherein the central processor produces a bus request signal to effect the transaction and within the same clock period puts the address data out on the bus. The request cycle is followed by an active cycle comprising at least one next clock period wherein the peripheral unit is accessed. The active cycle is followed by a data cycle comprising the next clock period and wherein data is placed on the bus by the peripheral unit. The bus control means also has means defining a block bus transaction mode for receiving a series of data request signals from the central processor in consecutive clock periods and for overlapping the cycles of consecutive transactions on the bus.

The Lbus control according to the present invention also has means for executing microdirect memory access transfer to achieve communication between a peripheral device and the cpu and thereafter the main memory. In a particularly advantageous embodiment of the present invention, a single centralized error correction circuit is shared by the memory, central processor and peripheral device and all data transfers over the bus are communicated through the single centralized error correction circuit.

Thus, a data unit for use with a data processing system according to the present invention has means therein which is responsive to a transaction request signal on the bus for receiving address data in a request cycle comprising one system clock period, means for accessing address data in an active cycle comprising at least one system clock period and for producing a weight signal when more than one system clock period is necessary and means for applying data to the bus in a data cycle comprising the next system clock period. The data unit also may comprise means for receiving request signals in consecutive clock periods and for overlapping the request, active and data cycles for consecutive transactions.

A data unit in accordance with the present invention, is also able to effect data transfers on the bus in synchronism with the system timing cycle under microcode control to effect a micro DMA data transfer.

These and other objects, features and advantages of the present invention are achieved in accordance with the method and apparatus of the present invention as disclosed in more detail hereinafter with regard to the attached appendix including a microcode listing, a listing of the microcode bits, the microcode compiler, the front end processor program, a summary of the list implementation language and listings of the program array logic devices referred to in the attached system drawings, wherein:

BRIEF DESCRIPTION OF THE DRAWINGS

FIGS. 10-23 are a schematic of a 512 K memory card according to FIG. 1.

DETAILED DESCRIPTION OF THE INVENTION

Figure 1:
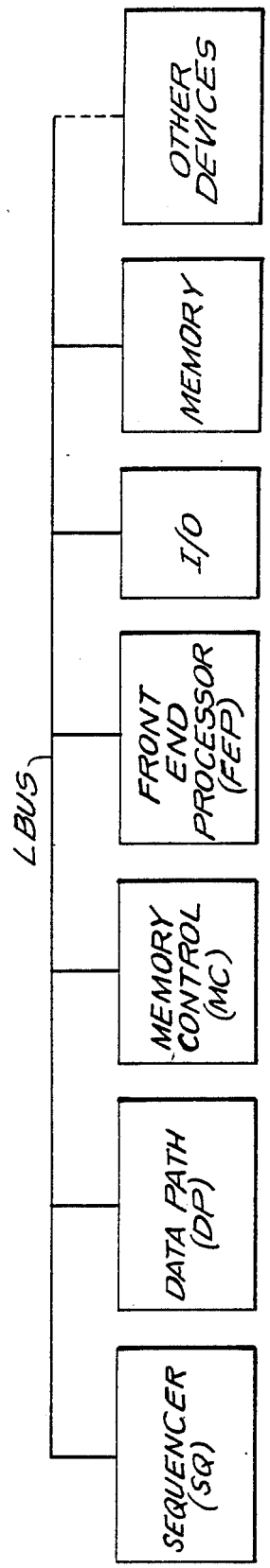
FIG. 1 is a block diagram of the system according to the present invention.

FIG. 1 is a block diagram of the system according to the present invention. As shown therein, the basic system of the present invention includes a sequencer SQ, a data path unit DP, a memory controller MC, a front end processor FEP an I/O unit and the main memory all connected in parallel on a common bus called the Lbus. As is also shown therein, other devices such as peripherals and the like can be connected in parallel along the Lbus.

The basic system includes a processor cabinet having reserved, color-coded slots are provided on the L bus backplane for the DP-ALU, SQ, FEP, IO and IFU-MEM boards. The rest of the backplane is undedicated, with 14 free 36 bit slots on the basic system. Plugging a memory board into an undedicated slot sets the address of that board. There are no switches on the boards for this purpose. For diagnostic purposes, the FEP can always tell which board is plugged into what slot it can even tell the serial number of the board.

No internal cables are used in the system. All board-level interconnections are accomplished through the backplane. An external cable is provided for connecting a console to the processor cabinet.

While the system according to the present invention is physically configured by components in the manner set forth in FIG. 1, many of the novel features of the system have elements thereof on one or more of the system components. Thus the system components will be described with respect to the function of the detailed circuitry contained therein followed by the operation of the system features in terms of these circuit functions.

SEQUENCER

Figure 2:
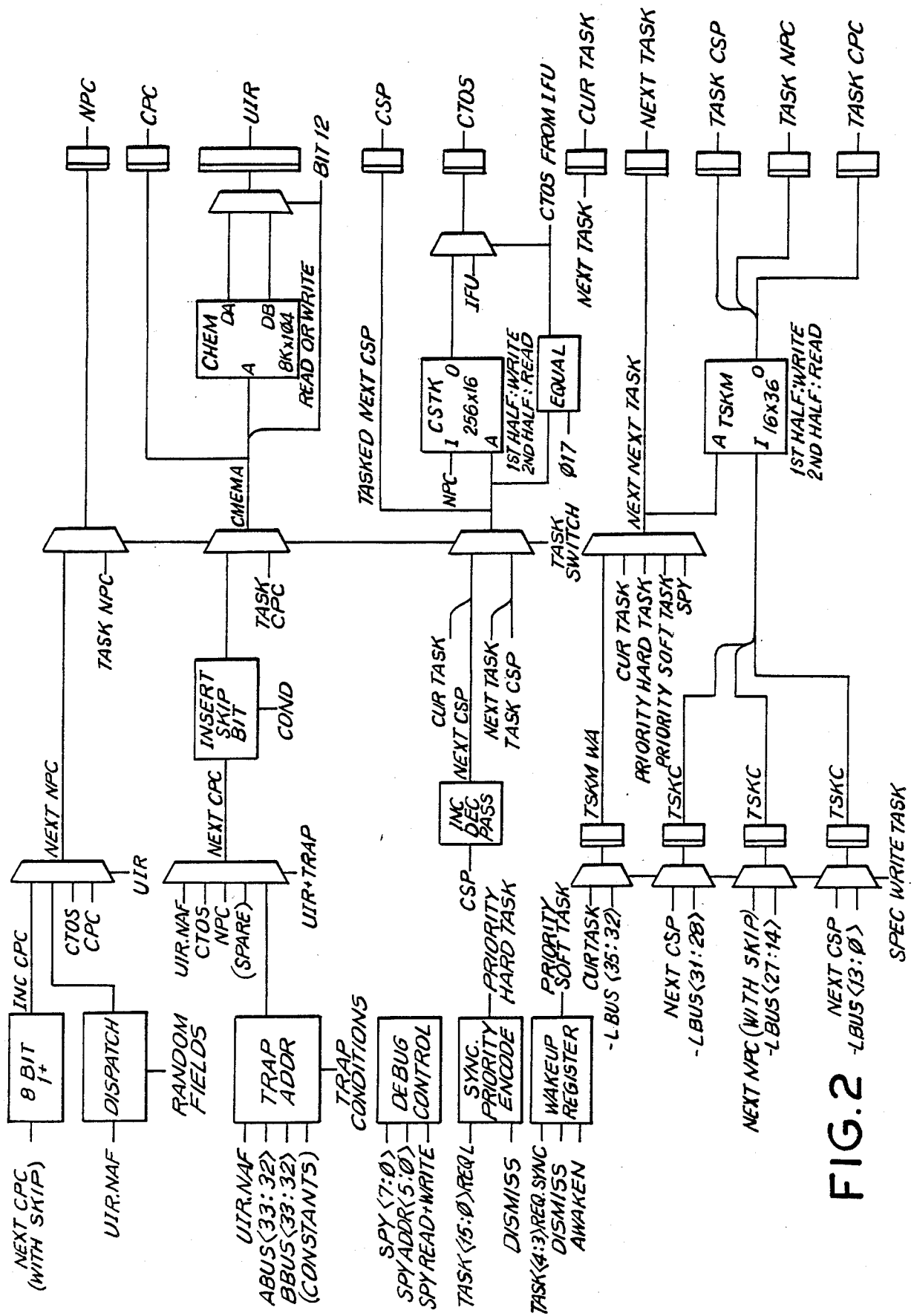
FIG. 2 is a block diagram of the sequencer of FIG. 1.

The sequencer is shown in block diagram form in FIG. 2.

The sequencer controls the operation of the machine, that is, it implements the microtasking. In carrying this out, it utilizes an $8K \times 112$ microcode control memory.

Each 112-bit microcode instruction specifies two 32-bit data sources from a variety of internal scratchpad registers. There is normally no need for one to write microprograms, since many Zetalisp instructions are executed in one microcycle.

The system micromachine is time-division multiplexed. This means that the processor performs housekeeping operations such as driving the disk in addition to executing macroinstructions. This has the advantage of providing a disk controller and other microtasks with the full processing capability and temporary storage of the system micromachine. The close coupling between the micromachine and the disk controller has been proven to be a powerful feature.

Up to eight different hardware tasks can be activated. Control of the micromachine typically switches from one task to another every few microseconds. The following other tasks run in the system:

Zetalisp emulator task—executes instructions

Disk transfer task—fetches data from main memory and loads the disk shift-register; handles timing and control for the disk sequencing.

Ethernet handshaking and protocol encoding and decoding, where Ethernet is a local-area-network for communication between computer system and peripherals, and their users. The physical structure of the Ethernet is that of a coaxial cable connecting all the nodes on the network.

The FEP and microdevices (i.e., those devices serviced by microcode, such as the disk controller and the Ethernet controller) can initiate task switches on their own behalf. The task priority circuitry on the sequencer board determines the priority of the microtasks. Multiple microcontexts are supported, eliminating the need to save a microtask's context before switching to another.

More specifically, the sequencer includes tasks state capture circuitry, task state memory for storing the tasks state, a task state parity, a task memory output register and a task priority circuit shown in FIG. 4 which determines the priority of 16 tasks which are allocated as follows:

Tasks 8-15: DMA or I/O tasks. Assigned to devices during boot time wakeup requests come from open-collector bus lines.

Task 7: Not used. The task state memory for this task is available for the FEP to clobber for debugging purposes. The only way this can become the current task is by the FEP forcing it.

Tasks 1, 2, 5, 8: Software. Wakeup requests are in a register; bit n can be set by doing a special function. One of these tasks is the background service task for all DMA tasks (set up next address and word count); the others remain unassigned.

Task 4: Low-speed devices; wakeup request from open-collector bus line.

Task 3: FEP service (wakeup settable by FEP)

Task 0: Emulator, Wakeup request is always true.

DMA tasks normally only run for 2 cycles per wakeup. The first cycle emits the physical address from A memory, increments it, does DISMISS, and skims on a condition from the device (e.g. error or end of packet). The second cycle decrements the word count and skips on the result (into either the normal first cycle or a "last" first cycle). The data transfer between device and memory takes place over the Lbus under control of the memory control. The "last" first cycle is the same as normal, but its successor sets a "done" flag and wakes up the background service task. It also turns off wake-up-enable in the device so more transfers don't try to happen until the next DMA operation is set up. For some devices there is double buffering of DMA addresses and word counts, and there are two copies of the DMA micocode; each jumps to the other when its word count is exhausted. Processing by the background service task is interruptible by DMA requests for other devices.

Tasks 1, 2, 5, 6, the software requested tasks, are only useful as lowered-priority continuations of higher-priority tasks. They would not normally be awakened by the Emulator (although START-I/O would do that).

Wakeup requests for the hardware tasks (8-15) are open-collector lines on the bus. These are totally unsynchronized. Each device has a register which contains a 3-bit task number and 1-bit tasking-enable; task numbers are assigned to devices according to the desired priority. A wakeup in the absence of enable is held until enable is turned on. Once a device has asserted its wakeup request, it should remain asserted (barring changing of enable or the assigned task number) until the request is dismissed. The request must then drop an adequate time before the end of that microinstruction cycle, so that 2 cycles later it will be gone from the synchronizer register and the task will not wake up again.

Delay from wakeup request to clock that finishes the first microinstruction of service is 4 to 5 cycles (or about a microsecond) if this is the highest priority task and no tasking-inhibit occurs. Really high speed devices may set their wakeup request 600 ns early. The processor synchronizes and priority-encodes the wakeup requests.

Dismissing is different for hardware and software tasks. When a hardware task is dismissed it executes one additional microinstruction when a sofatware task is dismissed it executes two additional microinstructions. The hardware task timing is necessary so that a DMA task can wake up and run for only two cycles.

If a dismiss is done when a task switch has already been committed such that the microinstruction after the dismiss is going to come from a different task, then the machine goes ahead and dismisses. This means that the succeeding microinstruction, which would normally be executed immediately, will not be executed until the next time the task wakes up. This does not apply to a task which dismisses as soon as it wakes up, such as a typical DMA task; since a task will not be preempted by a higher-priority task immediately after a task switch, when a task wakes up it is always guaranteed to run for at least 2 cycles.

Task-switch timing/sequencing is as follows:

First cycle, first half:

Prioritize synchronized task requests. Hardware task requests are masked out of the priority encoder if they are being dismissed this cycle.

First cycle, second half:

Selected task to NEXT NEXT TASK lines. If this differs from current task, NEXT TASK SWITCH asserted. Fetch state of selected task into TASK CPC, TASK NPC, TASK CSP registers. Just before clock, decide whether to really switch tasks or to stay in the same task, in which case the TASK CPC, etc. registers don't matter, and NEXT TASK SWITCH is turned off.

Second cycle, both halves:

TASK SWITCH asserted. TASK CPC selected onto CMEM A: fetch first microinstruction and new task. TASK NPC selected into NPC register. CPS gets CMEM A which is TASK CPC. TSKC register gets NEXT CPC, NEXT NPC, NEXT CSP, and CUR TASK lines. NEXT TASK lines have new task number.

Second cycle, second half:

Control-stack addressed by NEXT TASK and TASK CSP: CTOS gets top of new stack (unless switching to emulator and stack empty, gets IFU in that case). CSP gets TASK CSP.

Third cycle, both halves:

Execute first microinstruction of task. Fetch second microinstruction of task. If only waking up for 2 cycles (dismiss is asserted), choose next task this cycle (line first cycle above).

Third cycle, first half:

Task memory written from TSKC (save state of old task). Address is TSKM WA which got loaded from CUR TASK during second cycle.

Fourth cycle:

Execute second microinstruction of task. If only woke up for 2 cycles, TASK SWITCH is asserted and we do not choose another new task this cycle.

Another feature of the sequencer circuitry is trap addressing. The sources of traps are mostly on the data path board, with the memory control providing the MAP MISS TRAP. Slow jumps all come from the data path board. The sequencer executes normally if no trap or slow jump condition is present. With regard to the trap address interpretation:

Bit 12 is the skip bit; Bits 8–11 are the dispatch bits. Bits 0–7 are capable of incrementing. Thus each macroinstruction gets 4 consecutive control-memory locations; although there is a next-address field in the microinstruction. It is used for many things and so consecutive addressing is often important. It is also possible for most macroinstructions to skip into their consecutive addresses (except for the small opcodes where this conflicts with a wired-in trap address).

In order to do a dispatch, it is nexessary to find a block of 16 locations (in bits 8–11) which are not in use: this is done either by finding a block of opcodes that don't use all 4 of their consecutive locations, or by turning on bit 12 (there are a few dispatches that skip at the same time).

Each task gets 16 locations of control-stack since adders and multiplexors come in 4-bit increments. The CADR doesn't use the top half of its 32-location stack much. Really only 15 locations of control-stack may be used, because the memory is written on every cycle whether or not you PUSHJ.

The CSP register always points at the highest valid location in the stack. Thus it contains 17 when the stack is empty. We do write-before-read rather than read-before-write on this machine, however there is pipelining through the CTOS register. In fact a 1-instruction subroutine will work.

When the emulator stack is empty (CSP−17 and the emulator task is in control), there is an "extra" stack location which contains the next-instrution address from the IFU. POPJing to this location generates the NEXT INST signal and refrains from decrementing the stack pointer (leaves it 17 rather than making it 16). NEXT INST tells the IFU to advance and does one or two other random things (it clears the stack-adjustment counter in the data path).

In the first half of each cycle, NPC is written into the next free location (for the current task) in the control-stack. This is 1+ the location CSP points at. NPC usually contains 1+ the control-memory address from which the currently-executing microinstruction came.

In the second half of each cycle, the top of the control-stack is read into the CTOS register. In the next cycle, CTOS and CSP will agree with each other. When switching tasks, we read from the new task's stack.

Note that what happens when we POPJ, results from the pipelining. In the cycle before the PIPJ, the subroutine return address (or IFU next-instruction address) was read into the CTOS register; this came from the stack location pointed to by CSP if the previous cycle did not PUSHJ or POPJ. Now when we POPJ we decrement CSP and read the next lower subroutine return address into CTOS, in case the next cycle also POPJs. When POPJ goes to the next macroinstruction, CSP is not decremented and CTOS is loaded with the address for the macroinstruction after that.

Trapping forces a "PUSHJ" so that NPC gets saved. Slow-jump does the same, whether or not you wanted it. If we trap out of a POPJ, we change our mind and increment CSP rather than decrementing it. CTOS gets loaded with the NPC that we saved.

The control stack may be popped without jumping to it by specifying POPJ but not specifying for the control-memory address to come from CTOS.

To sum up what happens on the NEXT CSP lines, which are both the input to the CSP register and the address for control-memory, we first ignore tasking to keep things simple:

In The first half of each cycle, NEXT CSP contains CSP+1.

In the second half of each cycle, NEXT CSP contains CSP normally, but contains CSP−1 in the event of a POPJ or CSP+1 in the event of a PUSHJ.

A POPJ that causes NEXT INST generates CSP rather than CSP−1. A trap or slow jump generates CSP+1, like PUSHJ.

The first half is a write and the second half is a read.

In the first half of each cycle, the high bits are the current task; in the second half the high bits are the next task and the low bits may get swapped with the next task's CSP.

When pclsring out of a trapped instruction, it is necessary to set the CSP back to −1. This is done by using the −CTOS CAME FROM IFU skip condition, which is true when CSP−1 and this is the emulator task. One can POPJ (without using the CTOS as the microinstruction address source) until this condition becomes true.

TABLE 1

Microcode Control of Sequencer
U SEQ <1:0>
  0 no function
  1 pushj (i.e. increment CSP)
  2 dismiss current task
  3 popj (i.e. decrement CSP)
This field is effectively forced to 0 when the sequencer is stopped, and forced to 1 when a trap or slow jump is taken.
U CPC SEL <1:0>
Selects address from which next microinstruction will be taken, except for bit 12 which may be selected from -COND (skip).
  0 NAF (next-address-field of current instruction)
  1 CTOS (control-stack or IFU, normally used together with POPJ)
  2 NPC (take-dispatch, restore from trap)
  3 (spare)
A trap or slow jump supplies an address and ignores this field.
U NPC SEL
Selects source for loading NPC register.
Normally:
  0 NAF modified by dispatch in bits 11:8
  1 NEXT CPC+1 (only the low 8 bits increment)
With SPEC NPC SEL 1 and MAGIC=3 (or 0 on rev-3 board).
  0 CTOS (restore from trap)
  1 CPC (forced when taking trap or slow jump)
U NAF <13:0>
  Next-address field
These fields also used by data-path:
U COND FUNC <1:0>
  0 nothing
  1 SKIP (CMEM A 12 gets -COND)
  2 (TRAP IF COND)
  3 (TRAP IF -COND)
U SPEC <4:0>
  30 ARITHMETIC TRAP WITH DISPATCH
  (If trap to address in NAF, bits 11-8 get replaced by high type bits of Abus and Bbus.)
  31 HALT
  Stops the machine after executing this microinstruction.
  32 NPC MAGIC
  Modifies U NPC SEL above, also allows connection between the data path and the sequencer (see MICROINSTRUCTION.BITS).
  33 AWAKEN TASK
  Set wakeup for software task selected by U MAGIC <1:0>
  34 WRITE TASK
  Write task memory from address and data on Obus.
  35 TASK DISABLE
  Forces the current task to be the same in the cycle after next as in the next cycle. Because of this pipelining, you need to do this function twice in a row before it really takes effect.

The data path board always gets an ungated clock. Decoding of the microinstruction is modulated by NDP where necessary.

NDP is the DR of nop due to taking a trap, nop due to the machine waiting (see below), and nop due to the machine being stopped, either by the FEP or by a parity error or by a halt microinstruction.

Waiting is a kind of temporary stop. When the machine is waiting it continuously executes the same microinstrution without side-effects, until either the wait condition goes away or it switches tasks (other tasks might not need to wait). Upon return from the task switch the same microinstruction is executed again. Waiting is used to synchronize with the memory and IFU; a wait occurs if the data path asks for data from memory that hasn't arrived yet not in the temporary memory control, if an attempt is made to start a memory cycle when the memory is busy. If an attempt is made to do a microdevice operation when the bus is busy, or if the address from the IFU is being branched to (this is the last microinstruction of a macroinstruction) of a macroinstruction) and the IFU says that the address is provided (in the previous cycle) was bad.

The wait decision has to be made during the first half of the cycle, because it is used to gate the clock in some places.

A wait causes a NDP, inhibiting side-effects of the microinstruction, but only partially inhibits task switching in the sequencer. If a task switch was scheduled in the previous cycle, i.e. TASK SWITCH is asserted, then the sequencer state (CPC, NPC, UIR, CSP) is clocked from the new task's state, but the old task's state is not saved; thus the current microinstruction will be executed again when control returns to this task. If no task switch was scheduled, the sequencer state remains unchanged and the microinstruction is immediately retried. During a wait new task wakeups are still accepted and so the wait can be interrupted by a higher-priority task; when that task dismisses the waiting microinstruction will be retried.

A trap causes a NDP, inhibiting the side-effects of the microinstruction, but when a trap occurs, the sequencer still runs. The cycle is stretched to double-lengths so that the control-memory address may be changed to the trap address. Trapping interacts correctly with tasking. The cycle is still stretched to double length when though the actual control-memory address is not changing. The revised contents of the NEXT CPC lines (the trap address) gets written into the task-state memory. Note that NDP is not valid before the leading edge of the clock, and cannot be used to gate the clock.

In order for the memory control, which needs to decide whether to start a memory cycle well in advance of the clock, to work, things cannot be be this simple. NDP actually consists of an early component and a late component. The early reasons for NDP are stable by less than 50 ns after the clock and can inhibit the starting of a memory cycle. These include the machine being halted, LBUS WAIT, and wait due to interference for the Lbus. The latter signal is actually a little slower, but the memory control sees it earlier than NDP itself does and hence stabilizes sooner.

The late reasons for NDP are always false while the clock is de-asserted. After the leading edge of the clock, NDP can come on to prevent side-effects of the current microinstruction. If a memory cycle has been started, it cannot be stopped, however a write will be changed into a read. Except when there is a map miss NDP will stop it before the trailing edge of the clock. The late reasons for NDP are traps, parity errors, and the half microinstruction. All hardware errors are late because control-memory parity takes too long to check, but it is desirable to stop before executing the bad microinstruction rather than after, so that wrong parity in control memory may be used as a microcode breakpoint mechanism.

Control-memory parity is computed quickly enough to manage to stop the sequencer clocks (but not quickly enough to turn on NDP and distribute it throughout the processor—and all the signals that derive from NDP-before the leading edge of the clock).

All this is implemented by having a variety of clocks on the memory-control and sequencer board, gated by various conditions.

CLK—the main clock, which never stops.
SQ CLK—clock for the main sequencer state (CPC, NPC, CSP, CUR TASK). This is stopped by WAIT unless switching tasks.
UIR CLK—like SQ CLK but also clocked by single-step even if sequencer stepping is not enabled.
TSK CLK—like SQ CLK but not stopped by WAIT.
TSK CLK A —IDENTICAL TO TSK CLK; an electrically separate copy.
TSKC CLK—clock for the task-state-capture register.
Like SQ CLK but always stopped by WAIT.

The CTOS register is clocked by TSK CLK. It can't be clocked by SQ CLK because when the machine is waiting for the IFU the new address from the IFU must be clocked in. It shouldn't be clocked by CLK because when a parity error occurs in the control stack, it is desirable to be able to read this register before it changes.

Table 2 shows clocking conditions (assuming the machine is not stopped by the FEP and not stopped by an error).

TABLE 2

| DWTS | State | CTOS | CUR TASK | NEXT TASK | Capture | OPC | NOP | Error |
|---|---|---|---|---|---|---|---|---|
| – | clk | clk | clk | clk >= | clk | clk | no | clk |
| D– | clk | clk | clk | clk < | clk | clk | no | clk |
| –W– | hold | clk | hold | clk >= | no | clk | yes | clk |
| DW– | hold | clk | hold | clk >= | no | clk | yes | clk |
| –T– | clk | clk | clk | clk >= | clk | clk | yes | clk |
| D–T– | clk | clk | clk | hold | clk | clk | yes | clk |
| –WT– | hold | clk | hold | clk >= | no | clk | yes | clk |
| DWT– | hold | clk | hold | hold | no | clk | yes | clk |
| –S | clk | clk | clk | hold | clk | clk | no | clk |
| D–S | clk | clk | clk | clk = | clk | clk | no | clk |
| –W–S | clk | clk | clk | hold | no | clk | yes | clk |
| DW–S | clk | clk | clk | hold | no | clk | yes | clk |
| –TS | clk | clk | clk | hold | clk | clk | yes | clk |
| D–TS | clk | clk | clk | hold | no | clk | yes | clk |
| –WTS | clk | clk | clk | hold | no | clk | yes | clk |

TABLE 2-continued

| DWTS | State | CTOS | CUR TASK | NEXT TASK | Capture | OPC | NOP | Error |
|------|-------|------|----------|-----------|---------|-----|-----|-------|
| DWTS | clk   | clk  | clk      | hold      | no      | clk | yes | clk   |

D = DISMISS (task voluntarily going away, after 1 (or 2) more microinstructions)
W = MC WAIT (NOP this microinstruction and try it again, on demand of memory control)
T = Trap (Double-length cycle, NOP this microinstruction, take different successor)
S = TASK SWITCH (next microinstruction from different task)
State = UIR, NPC, CPC, CSP
Capture = task-state capture registers
Error = hardware error registers When the machine is stopped, it is possible to single-step the sequencer and the data path either separately or together, and to read and write the microinstruction register without disturbing any state. This makes it posible to save and restore the complete state (save the UIR, step just the sequencer to bring all of its state to the spy bus, then execute microinstructions to read the data-path state). It is possible to run the machine at full speed with control-memory disabled, so that the UIR doesn't change, to make one-microinstruction scope loops. It is also possible to run the data path at full speed with the sequencer stopped, which may or may not be useful.

The FEP controls this via the control register on SQCLKC, which is cleared when the machine is reset:

| | | |
|---|---|---|
| 0 | RUN | Set to 1 to let the machine run freely |
| 1 | STEP | Set to 0 then to 1 to clock the machine once |
| 2 | ENABLE DP | If 0, STEP doesn't affect the data path |
| 3 | ENABLE SQ | If 1, STEP and RUN don't affect the sequencer except UIR |
| 4 | ENABLE CHEM | If 1, UIR from CMEM, else from CMEM WD register |
| 5 | CMEM WRITE | If 1, write control-memory |
| 6 | ENABLE TRAP | If 1, trap conditions set nop and change cmem address |
| 7 | ENABLE ERRHALT | If 1, parity error will inhibit RUN |
| 8 | ENABLE TASK | If 1, enables task scheduling, if 0 the task number is forced from these bits here |
| 9-12 | TASK | |
| 13 | ENABLE WP | Enable write-pulse to task and control-stack memories |
| 14 | | spare |
| 15 | | spare |

When writing control-memory, CMEM ENB must be 0 to inhibit the RAM outputs and trapping must be disabled so that the control-memory address is stable. Normally UIR would be set up to source the appropriate address.

Trapping (i.e. branching to a special address and nop'ification) does not occur if TRAP ENB is zero. Note that when trapping is enabled reading the NEXT CPC line isn't too useful since they alternate between the normal address and the trap address in every cycle.

When the sequencer is stopped, the following do not change:

CSP, CPC, NPC, CTOS, CUR TASK

The following do not change when the sequencer is stopped, except that single-stepping changes them regardless of ENABLE SQ:

UIR

If you don't want the UIR to change, you disable control memory and store the appropriate value in the CMEM WD register, which will then be loaded into UIR.

The task registers are clocked on every clock, regardless of whether the sequencer is running. These are the registers after the task memory. The registers before the task memory clock only if the state of the sequencer is to be saved, i.e. if the sequencer is running or being single-stepped is to be saved, i.e. if the sequencer is running or being single-stepped and MC WAIT is not true. All of the main sequencer state registers, including the current task, clock only when the sequencer is running. The FEP can control whether the task chosen when the sequencer is running or single-stepping comes from the task scheduler or a task number supplied by the FEP.

The diagnostic interface to the system includes the Spy bus. This is an 8-bit wide bus which can be used to read from and write to various portions of the 3600 processor. The readable locations in the processor allow the FEP to "spy" on the operation of the cpu, hence the name "Spy bus". Using the Spy bus, the FEP can force the processor to execute microinstructions, for diagnostic purposes.

When diagnostics are not running, the FEP uses the Spy bus as a special channel to certain DMA devices. Normally, The FEP uses the Spy bus to receive a copy of all incoming Ethernet packets. It can also set up and transfer to the Ethernet and read from the disk via the Spy bus.

Table 3 shows the spy functions on the sequencer board:

TABLE 3

SPY WRITE CMEM0,1,....13 WO
  Write an 8-bit slice of the CMEM WO register. This register is a source of write data for control-memory and also a source of microinstructions into UIR when cmem is disabled.
SPY READ CMEM0,1,...13
  Read an 8-bit slice of UIR (which typically contains data from CHEM).
SPY WRITE CTL1,2
  Write sequencer control & clock register described above. This has two spy functions since it is a 16-bit register; the CTL1 is the least-significant byte.
SPY READ NEXT CPC (2 addresses)
  Read NEXT CPC lines, which are the control-memory address in the absence of tasking. Allows reading NPC, CTOS, trap address, U NAF.
  To read the CPC you must first single-step it into the NPC. To control the NEXT CPC selection you force a microinstruction into the UIR.
SPY READ SQ STATUS (2 addresses)
  Read error halt conditions as a 16-bit word:
  7 AU STOP            15 -ERRHALT
  6 MC STOP            14 TSK-STOP
  5 BMEM PAR ERR       13 CTOS CAME FROM IFU
  4 AMEM PAR ERR       12 CMEM (UIR) PAR ERR
  3 PAGE TAG PAR ERR   11 TASK MEM PAR ERR
  2 TYPE MAP PAR ERR   10 CTOS (LEFT) PAR ERR
  1 GC MAP PAR ERR      9 CTOS (RIGHT) PAR ERR
  0 (spare)             8 MICROCODE HALT
SPY READ TASK
  <3:0> are CUR TASK

TABLE 3-continued

SPY READ SQ STATUS2
  More status:
    1-0 are the CTOS parity bits
SPY READ SQ BOARD ID
  Read the board-ID prom (gives serial number, ECO level, etc.)
  Address comes from the U AMRA <4:0> field of UIR
SPY READ DP BOARD ID
  Read the board-ID prom on the datapath board (the spy address is decoded by the sequencer).
SPY READ OPC1,2
  Reads PC history memory.
  This is a 16 entry RAM where each entry contains a PC in bits <13:0>, bit <14> = -NOP for that microinstruction, and bit <15> = 1 if the next microinstruction came from a different task. The OPC memory reads out backwards (i.e. with the sequencer stopped, the first read gets you the last instruction executed, the next read gets you the instruction before that, etc.) After 16 reads it is back in its original state.
  Because you can only read this one byte a time (reading either byte the address counter) you have to first read all 16 even bytes and then read all 16 odd bytes).

DATA PATH

Figure 3:
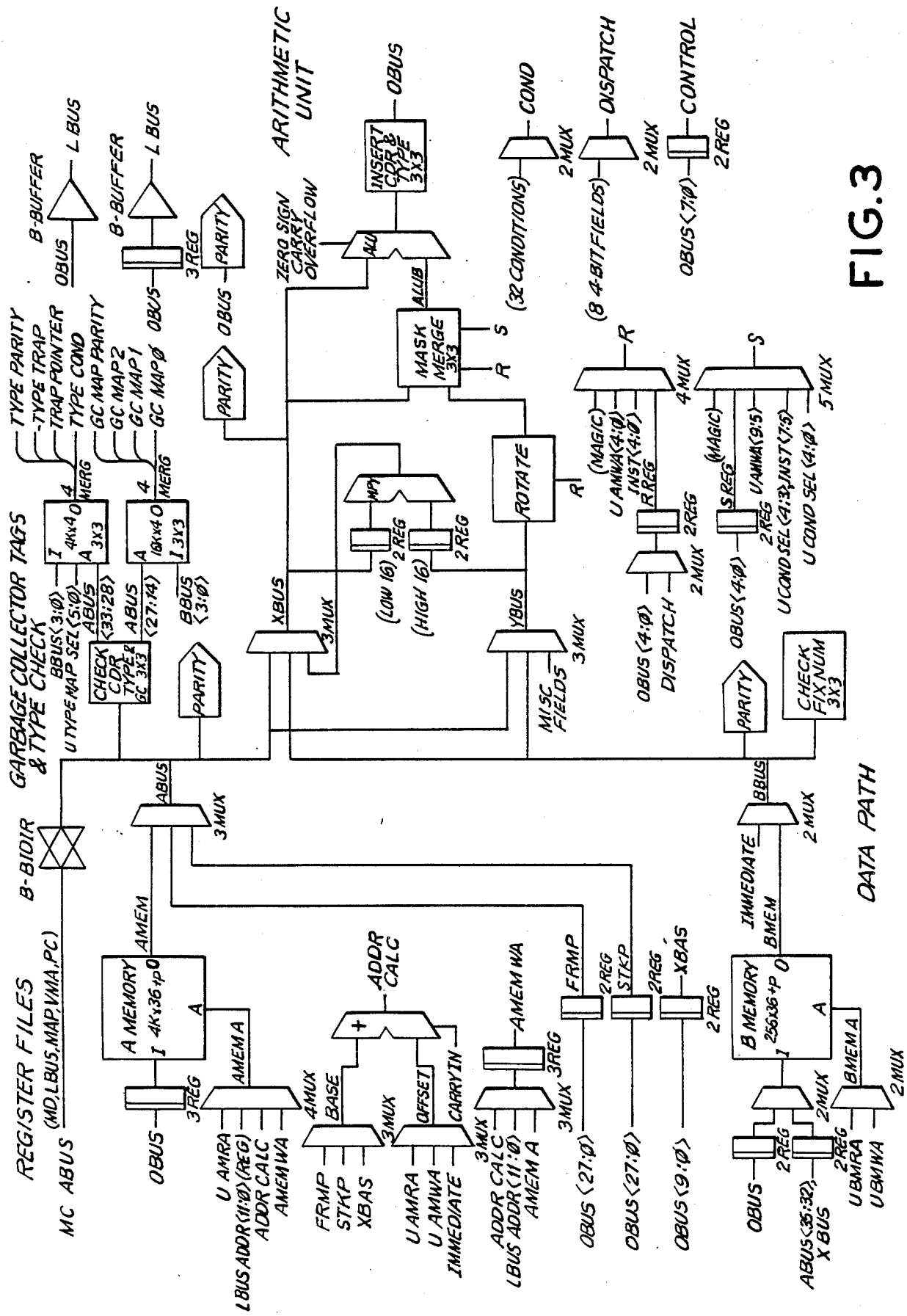
FIG. 3 is a block diagram of the data path of FIG. 1.
Figure 4:
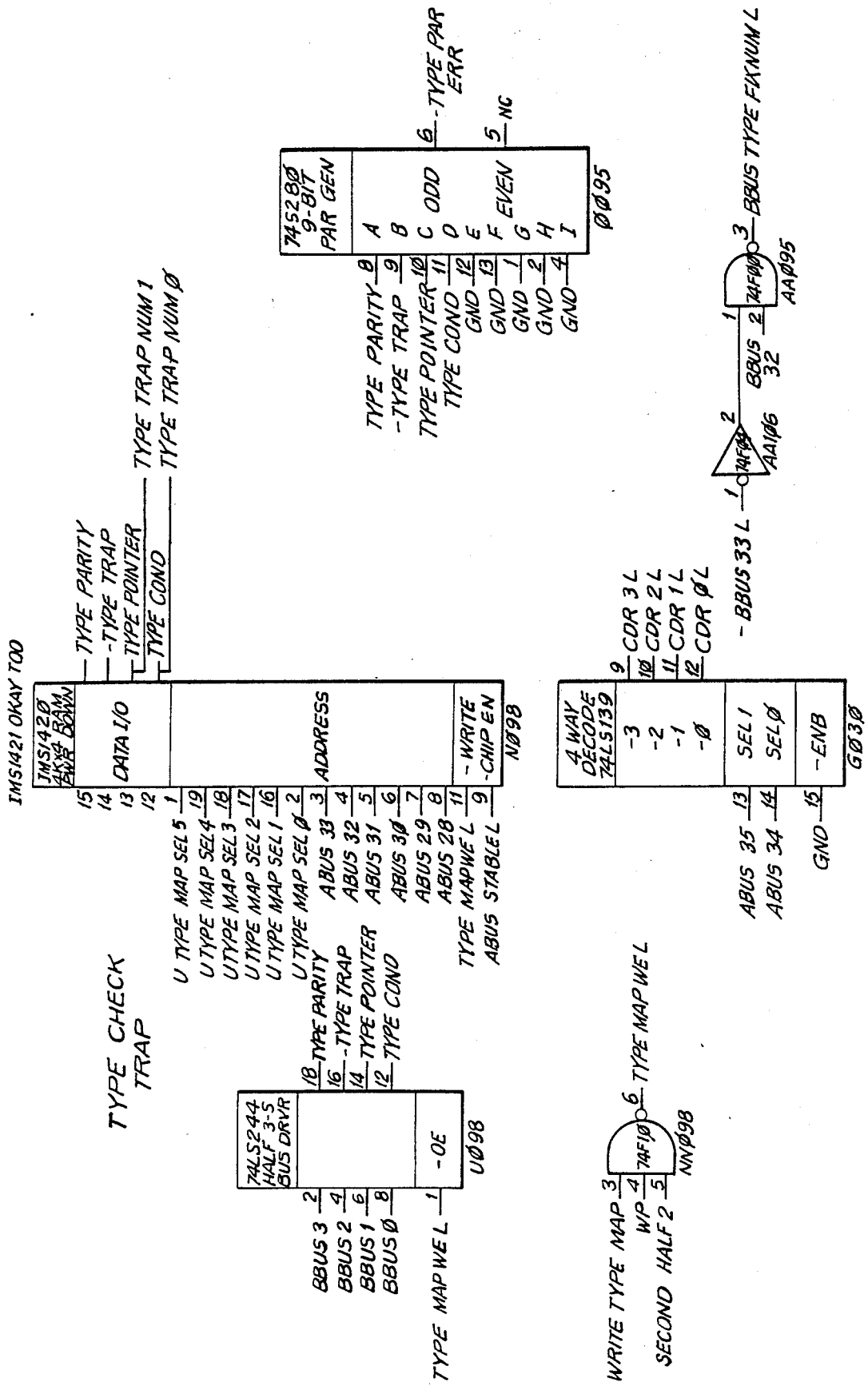
FIG. 4 is a schematic of the data path data type tag circuitry.
Figure 5:
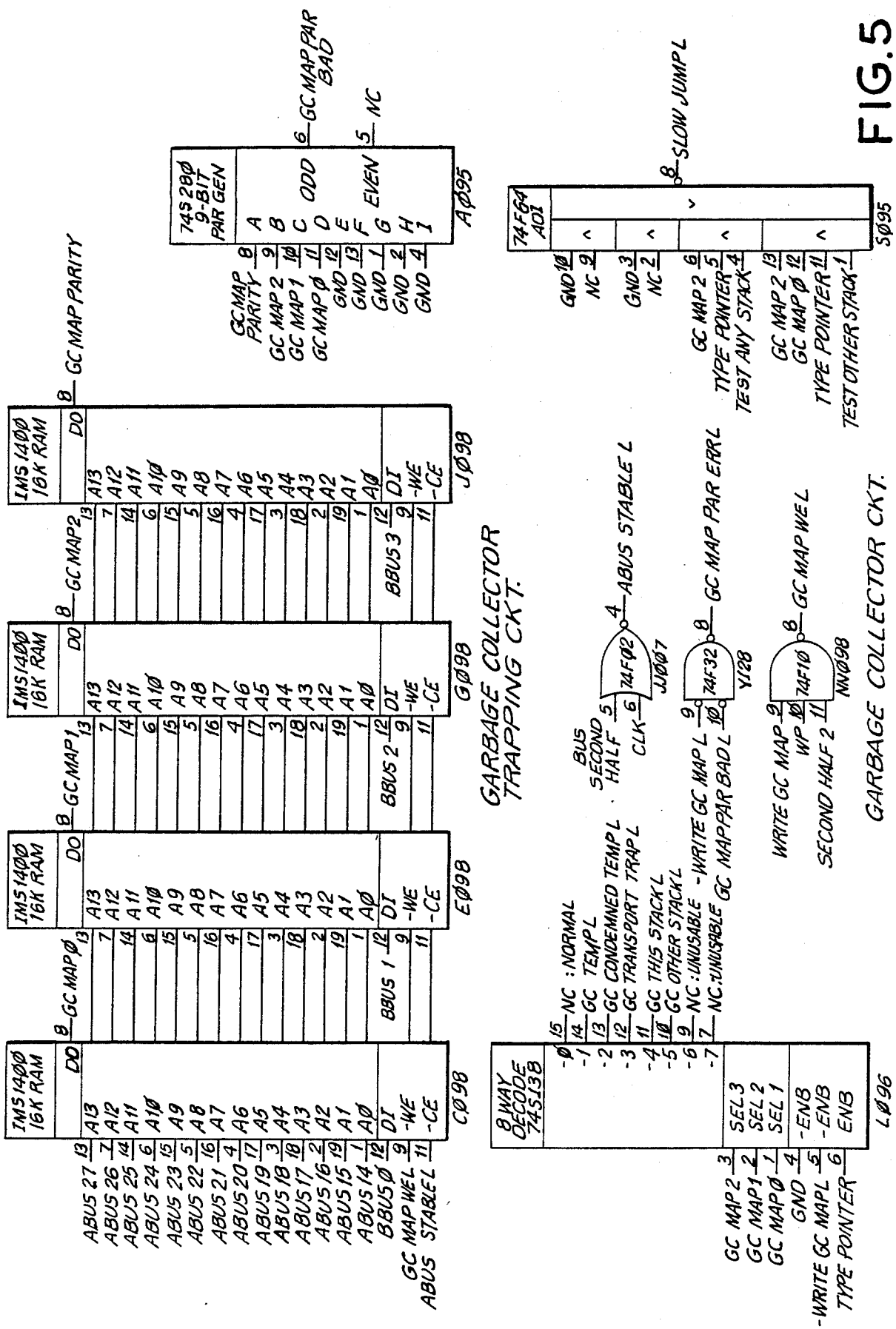
FIG. 5 is a schematic of the data path garbage collection circuitry.
Figure 6:
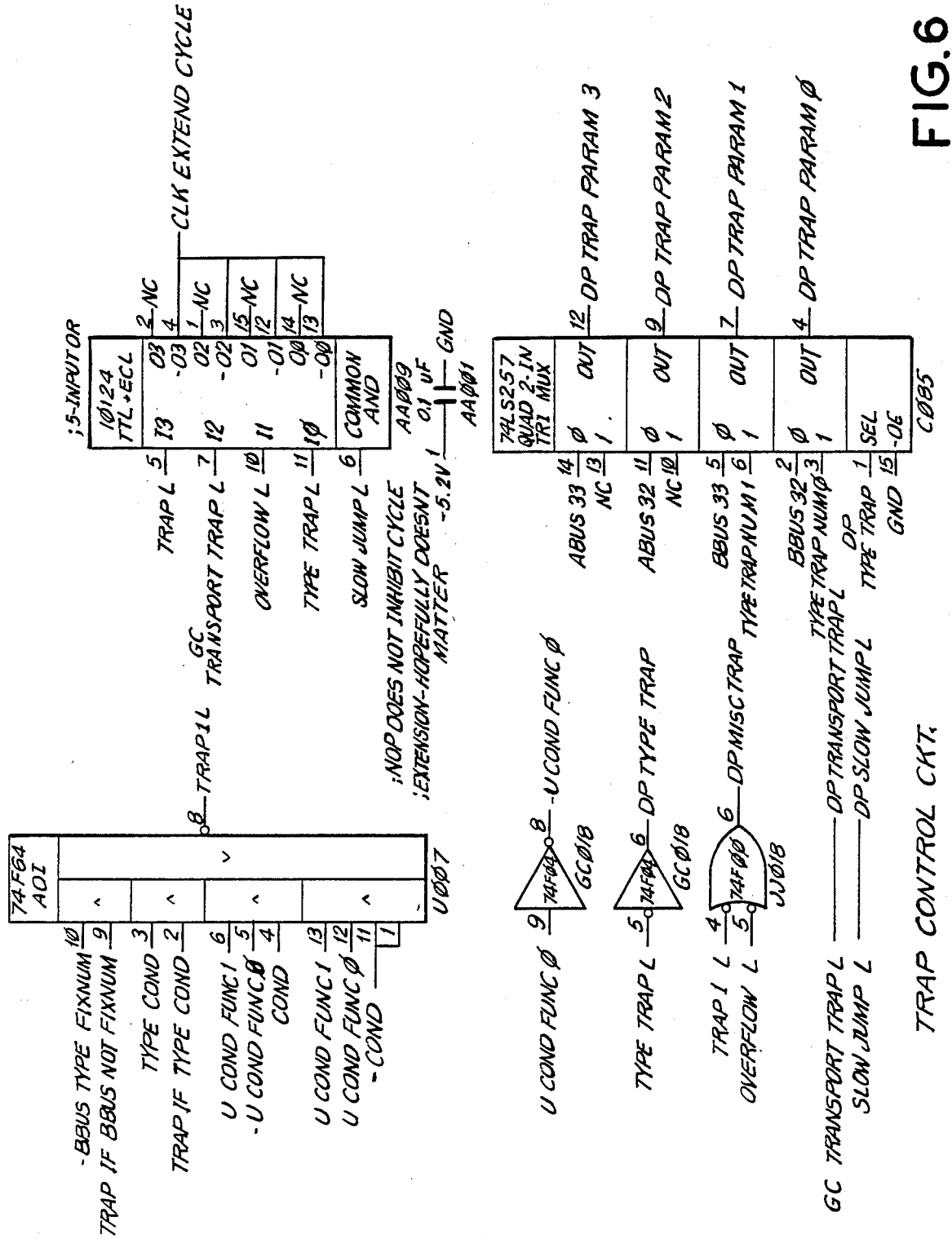
FIG. 6 is a schematic of the data path trap control circuitry.

The data path unit is shown in block diagram form in FIG. 3 with the various circuit elements shown in the block diagram shown in more detail in FIGS. 4-6.

The data path unit includes the stack buffer, the arithmetic logic unit (ALU), the data typing circuitry, the garbage collection circuitry and other related circuit elements.

The A and B memories include the two stack and buffers described hereinabove. The A memory is a 4K×40 bit memory and the B memory which is a 256×40 bit memory.

Garbage collection circuitry is shown in FIG. 5 and trap control, condition dispatch and microinstruction decode circuitry is shown in FIGS. 3-6.

The ALU is used to carry out the arithmetic combination of a given address and offset and is dedicated solely thereto. As can be seen from the data flow path in the block diagram of FIG. 3, the circuitry on the data path unit separates the type field from the data object and thereafter checks the type field with respect to the operation and generates a new type field in accordance with the operation. The new type field and the results of the operation are combined thereafter.

The central processing unit (cpu or processor) exemplifies a tagged architecture computer wherein type-checking is used to catch invalid operations before they occur. This ensures program reliability and data integrity. While type-checking has been integrated into many software compilers, the present system performs automatic type-checking in hardware, specifically the above-mentioned circuitry in the sequencer. This hardware allows extremely fast type-checks to be carried out at run-time, and not just at compile-time. Run-time type-checking is important in a dynamic Lisp environment, since pointers may reference many different types of Lisp objects. Garbage-collection algorithms (explained hereinafter) also need fast type-checking.

Automatic type-checking is supported by appending a tag field to every word processed by the cpu. The tag field indicates the type of the object being processed. For example, by examining the tag field, the processor can determine whether a word is data or an instruction.

With the tagged architecture, all (macro)instructions are generic. That is, they work on all data types appropriate to them. There is, for example, only one ADD operation, good for fixed and floating-point numbers, double-precision numbers, and so on. The behavior of a specific ADD instruction is determined by the types of the operands, which the hardware reads in the operands' tag fields. There is no performance penalty associated with the type-checking, since it is performed in parallel with the instruction. By using generic instructions and tag fields, one (macro)instruction can do the work of several instructions on more conventional machines. This permits very compact storage of compiled programs.

In the present system a word contains one of many different types of objects. Two basic formats of 36-bit words are provided.

One format, called the tagged pointer format, consists of an 8-bit tag and 28 bits of address. The other immediate number format consists of a 4-bit tag and 32 bits of immediate numerical data. (In main memory, each word is supplemented with 8 more bits, including 7 bits of ECC).

Two bits of every word are reversed for list compaction or cdr-coding. The cdr-code bits are part of a technique for compressing the storage of list structures. The four possible values of the cdr-code are: normal, error, next, and nil. Normal indicates a standard car-cdr list element pair, next and nil represent the list as a vector in memory. This takes up only half as much storage as the normal case, since only the cars are stored. Zetalisp primitives that create lists make these compressed cdr-coded lists. Error is used to indicate a memory cell whose address should not be part of a list.

34 data types are directly supported by the processor. The type-encoding scheme is as follows. A Zetalisp pointer is represented in 34 bits of the 36-bit word. The other two bits are reserved for cdr-coding. The first two bits of the 34-bit tagged pointer are the primary data typing field. Two values of this field indicate that the 32-bits hold an immediate fixed-point of floating-point number, respectively. (The floating-point representation is compatible with the IEEE standard). The other two values of the 2-bit field indicate that the next four bits are further data type bits. The remaining 28 bits are used as an address to that object. The object. The object types include:
  symbols (stored in four parts: print-name, value, function, and properly-list)
  lists (cons cells)
  strings
  arrays
  flavor instances
  bignums (arbitrary-precision integers)
  extended floating-point numbers
  complex numbers
  extended complex numbers
  rational numbers
  intervals
  coroutines
  compiled code
  closures
  lexical closures
  nil The present-system is stack-oriented, with multiple stacks and multiple stack buffers in hardware. Stacks provide fast temporary storage for data and code references associated with programs, such as values being computed, arguments, local variables, and control-flow information.

A main use of a stack is to pass arguments to instructions, including functions and flavor methods. Fast function calling is critical to the performance of cpu-bound programs. The use and layout of the stack for function calling in the system is novel.

In the system, a given computation is always associated with a particular stack group. Hence, the stacks are organized into stack groups. A stack group has three components:

A control stack—contains the lambda bindings, local environment, and caller list.

A binding-stack—contains special variables and counter-flow information.

A data-stack—contains Lisp objects of dynamic extent (temporary arrays and lists).

In the system, a stack is managed by the processor hardware in the sequencer as set forth above. Many of the system instructions are stack-oriented. This means they require no operand specification, since their operands are assumed to be on the top of the stack. This reduces considerably the size of instructions. The use of the stack, in combination with the tagged architecture features, also reduces the size of the instruction set.

The control stack is formatted into frames. The frames usually correspond to function entities. A frame consists of a fixed header, followed by a number of argument and local variable slots, followed by a temporary stack area. Pointers in the control stack refer to entries in the binding stack. The data stack is provided to allow you to place Zetalisp objects in it for especially fast data manipulations.

Active stacks are always maintained in the stack buffers by the hardware. The stack buffers are special high-speed memories inside the cpu which place a process's stack into a quick access environment. Stack buffer manipulations (e.g., push, pop) are carried out by the processor and occur in one machine cycle.

At the macroinstruction level, the system has no general-purpose registers in the conventional sense, as it is a stack-oriented machine. This means that many instructions fetch their operands directly from the stack.

The two 1K word stack buffers are provided in order to speed the execution of Zetalisp programs. The stack buffers function as special high-speed caches used to contain the top portion of the Zetalisp stack. Since most memory references in Zetalisp programs go through the stack, the stack buffers provide very fast access to the referenced objects.

The stack buffers store several pages surrounding the "current" stack pointer, since there is a high probability they will contain the next-referenced data objects. When a stack overflows or underflows the stack buffer, a fresh page of the stack buffer is automatically allocated (possibly deallocating another page).

Another feature of the stack buffers which supports high-speed access is the use of hardware-controlled pushdown pointers, eliminating the need to execute software instructions to manipulate the stack. All stack manipulations work in one cycle. A hardware top-of-stack register is provided for quick access to that location at all times.

The stack buffer has some area thereof which is allocated as a window to the stack, which means that somewhere in the main memory is a large linear array which is the stack that is being currently used and this window points into some part of it so that it shadows the words that are in actual memory. The window is addressed by a two segment addressing scheme utilizing a stack pointer and an offset. The ALU associated with the stack buffer, combines the pointer and offset in one cycle to address the window in the stack buffer.

In a Lisp environment, storage for Lisp objects is allocated out of a storage area called the heap in virtual memory. Storage must be deallocated and returned automatically to the heap when objects are no longer referenced. In order to manage the dynamic storage allocation and deallocation, storage manager and garbage collection routines must be implmented. Garbage collection is the process of finding "unreferenced" objects and reclaiming their space for the heap. This space is then free to be reallocated.

The goal of a good garbage collection algorithm is to reclaim storage quickly and with a minimum of overhead. Conventional garbage collection schemes are computationally costly and time-consuming, since they involve reading through the entire address space. This is done in order to prove that nowhere in the address space are there any references to the storage being considered for reclamation. The design of the present system includes unique features for hardware assistance to the garbage collection algorithms which greatly simplify and speed up the process. These hardware features are used to "mark" parts of memory to be included in the garbage collection process, leaving the rest of memory untouched. These hardware features include:

Type fields which indicate pointers

Page Tag which indicate pages containing pointers to temporary space

Multi-word read instructions which speed up the memory scanning.

The 2-bit type field inserted into all data words by the hardware simplifies garbage collection. This field indicates whether or not the word contains a pointer, i.e., a reference to a word in virtual memory.

For each physical page of memory there is a bit called a page tag. This is set by the hardware when a pointer to a temporary space is written into any location in that page. When a disk page is read into a main memory page and after a garbage-collection cycle, the microcode sets the bit to the appropriate value. When the garbage-collector algorithm wants to reclaim some temporary space, it scans the page-tag bits in all the pages. Since the page tag memory is small relative to the size of virtual memory, it can be scanned rapidly, about 1 ms per Mword of main memory that it describes. For all pages with the page-tag bit set, the garbage collector scans all words in that page, looking for pointers to "condemned" temporary space. For each such pointer it copies out the object pointed to and adjusts the pointer.

Multi-word read operations speed up the garbage collection by fetching several words at a time to the processor.

The virtual memory software assists garbage collection with another mechanism. If a page with its page-tag bit set is written to disk, the paging software will scan through the contents of the page to see what it point at. The software creates a table recording the swapped-out pages which contain pointers to temporary spaces in memory. Since the garbage collector checks this table, it can tell which pages contain such pointers. This knowledge is used to improve the efficiency of the garbage-collection process, since only the pages with temporary-space pointers are read into memory during garbage collection.

PAGE TAG IMPLEMENTATION

The page tag bits are made out of 16K static RAM. The following inputs exist:

LBUS ADDR 23:19—the physical page to be accessed next.

NORMAL ACTIVE L—true if this is an active cycle and the page tags are supposed to see it.

LBUS STATE CLK L—the clock gated by LBUS WAIT.

DP SET CG TAG L—true during an active cycle if the datapath output during the previous cycle was a pointer and its address was in a temporary space. If this active cycle is for a virtual write, the GC tag bit needs to be set.

WRITE ACTIVE L—true during an active write cycle (registered version of LBUS WRITE L).

WRITE PAGE TAG L—true if lbus-dev-write of the page tag being done.

READ PAGE TAG L—true if reading page tag (via lbus-dev-write).

LBUS DEV 4:3—modifiers for the above.
  Note: the spec and magic fields could be used instead of the microdevice I/O.

The following outputs exist:

LBUS DEV COND L—Asserted when READ PAGE TAG and the selected tag bit is set.

PAGE TAG PAR ERR L—asserted when bad parity is read from the page tags.

Microcode control:

One selects a physical page by doing a read of any location in the page. Normally the address would be supplied as a physical address on the Abus although the VMA could also be used. Actually starting a read isn't necessary; it's only necessary to convince the memory control to put the physical address on the Lbus. In the next cycle one uses a microdevice operation to read or write the page tage for the addressed page.

Since the address is supplied in the previous cycle before the read and write, it is necessary to prevent a task switch from intervening. This is done by specifying SPEC TASK-INHIBIT in the microinstruction-before-the one that emits the address on the Abus. It is also possible for a FEP memory access to intervene between the two microinstructions, i.e. the microdevice operation may have to wiat for the Lbus to become free. The page tag's address register is not clocked when MC WIAT is asserted, which takes care of this problem.

WRITE PAGE TAG L is asserted during second half when writing to microdevice slot 36, subdevice 1 (on the FEP board).

LBUS DEV 3 is written into the selected bit. The other remains unchanged.

LBUS DEV 4 selects which bit:

| 0 | the gc tag bit |
| 1 | the referenced bit |

READ PAGE TAG L is asserted when writing to microdevice slot 36 subdevice 3.

LBUS DEV 4:3 select the bit to read, as follows:

| 00 | the gc tag bit |
| 01 | the referenced bit |
| 10 | the parity bit |
| 11 | (not used) |

The preselected bit comes back on the LBUS DEV COND L line and may be used as a skit condition.

Scanning GC page tag takes place at the rate of 2 cycles per bit. This amounts to 1 millisecond per 750K of main memory. The microcode alternates between cycles which emit a physical address on the Abus, start a read, and do a compare to check for being done, and cycles which increment the physical address and also skit on the tag bit, into either the first cycle again or the start of the word scanning loop.

There is no special function for writing a pointer into main memory to enable the check and setting of gc page tag. Instead, any write into main memory at a virtual address, where the data type map says the type is a pointer, and the gc map says it points at temporary space, will set the addressed gc page tag bit in the following cycle if necessary.

The SKTP, FRMP, and XBAS registers can be used to address A-memory. The low 10 bits of one of these registers is added to a sign-extended 8-bit offset which comes from the microinstruction or the macroinstruction. This is then concatenated with a 2-bit stack bas register to provide a 12-bit A-memory address. The microcode can also select a 4th pseudo base register, which is either FRMP or STKP depending on the sign of the macroinstruction offset. Doing this also adds 1 to the offset if it is negative. Thus you always use a positive or zero offset with FRMP and a negative or zero offset with STKP in this mode.

STKP points at the top of the stack. FRMP points at the current frame.

STKP may be incremented or decremented independently of almost everything else in the machine, and there is a 4-bit counter which clears at the beginning of a macroinstruction and increments or decrements simultaneously with STKP: this allows changes by pulse or minus 7 to STKP to be undone when a macroinstruction is aborted (polsred).

STKP and FRMP are 28-bit registers, holding virtual addresses, and may be read onto the data path. XBAS is only a 10-bit register and may not be read back. (The FEP can read it back by using it as a base register and seeing what address develops.) The XVAS register is not used by most of the normal microcode, but it is there as a provision for extra flexibility. The microcode which BLTs blocks of words up and down in the stack (used by function return, for example)., needs two pointers to the stack. It currently uses FRMP and STKP, but might be changed to use XBAS and STKP. The funcall (function call with variable function) microcode uses XBAS to hold a computed address which is then used to access the stack.

INTERFACE WITH MEMORY CONTROL BOARD

The data path and the memory control need to communicate with each other for the following operations:

Reading the VMA and PC registers into the data path.

Writing the VMA and PC registers from the data path.

Accessing the address map (at least writing it).

Reading main memory or memory-mapped I/O device.

Writing main memory or memory-shaped I/O device.

Emitting a physical address (especially in a "DMA" task).

Using the bus to access devices such as floating-point unit and doing "microdevice" (non-memory-mapped) I/O.

Setting the GC page tag bit when a pointer is written into memory.

The MC does its own microinstruction decoding. There is a 4-bit field just for it, and it also looks at the Spec, Magic, A Read Address, and A Write Address fields. The A address fields have 9 bits each available for the MC when the source (or destination) is not A-memory, which is normally the case when reading (or writing) the MC. Also the A-memory write address can be taken from the read address field, freeing the write address field for use by the MC. This occurs during the address cycle of a DMA operation, which increments an A-memory location but also hacks the MC. The MC and the sequencer also have a good deal of communication, mostly for synchronization and for the IFU.

The following signals connect between the DP and MC boards:

BK ABUS 35:0—bidirectional extension of the data path's Abus. This is used to read VMA, PC, mpa, and memory (or bus) data into the data path, and to emit physical addresses from the data path. Bits 31-0 are bidirectional, but bits 35-32 are unidirectional, they always go from the memory control to the data path; this allows the cdr code of a memory location to be merged into the data to be stored into it, which needs to be on the Abus so it can get to the type and gc maps. The parity bits on the internal Abus do not connect to the MC.

LBUS 35:0—the main data bus. The data path can drive this either directly or through a register. This is used when writing main memory, when writing the bus, and when writing registers on the MC board. The error-correction bits do not connect to the DP.

LBUS ADDR 11:0—physical memory address into the data path. This is used when a supposed main memory access actually refers to internal A memory. See below.

MC OBUS TO LBUS L—DP result from this cycle drives LBus.

MC OBUS REG TO LBUS L—DEP result from last cycle drives LBUS.

GC TEMP L—to GC page tag bits. If this is asserted at the end of a cycle which writes into main memory, then during the following cycle, which is when the write actually hapens, the GC page tag bit for the page being written into its turned on.

MC ADDR IN AMEM L—Asserted if the last memory address selected by this task (need only work for emulator) points at A-memory. The data path uses this to enable A-memory instead of BK ABUS for memory reads, and to enable A-memory writing for memory writers. See below.

ABUS OFFBOARD L—Asserted if the BK ABUS is an input to the data path. The DP drives the BK ABUS whenever it isn't receiving it.

SEQUENCE BREAK—Tells the IFU to generate a bogus instruction to take the sequence break (macrocode interrupt).

The data path assumes that when a memory reference is redirected to A-memory, the memory control will provide the right address on the Lbus address lines.

For writing, things are simple. In the first cycle, the data path computes to write data; in the second cycle the write data is driven onto the Lbus, where it gets error-correction bits added. The memory card swallows the address at the end of the first cycle and the data during the second. The A-memory wants to the same timing; in the first cycle the address coms from the Lbus and the data come from the Obus inside the data path; in the second half of the second cycle the actual write is performed from the A-memory pipelining registers.

The trap control circuitry of FIG. 46 effects the feature of trapping out of macrocode instruction execution. For example a page table miss trap to microcode looks in the page hash table in main memory. If the page is found, the hardware map is reloaded and the trap microinstruction is simply restarted. A PCLSR of the current instruction happens only if this turns into a fault because the page is not in main memory or a page write-protected fault.

Another trap is where there is an invisible pointer. This trap to microcode follows the invisible pointer, changing the VMA and retries the trap to microinstruction.

Memory write traps include one which is a trap for storing a pointer to the stack, which traps to microcode that maintains the stack GC tables. This trap aborts the following micro instruction, thus the trapped write completes before the trap goes off. The trap handler looks at the VMA and the data that was written into memory at that address, makes entries in tables and then restarts the aborted microinstruction. If it is necessary to trap out to microcode, there are two cases. If the write was at the end of a macroinstruction, then that instruction has completed and the following instruction has not started since its first microinstruction was aborted by the trap. However, the program counter has been incremented and the normal PCLSR mechanism will leave things in exactly the right state. The other cases where the write was not at the end of a macroinstruction, in this case the instruction must be PCLSR, with the state in the stack and the first part done flag.

Another trap is a bad data type of trap and an arithmetic trap wherein one or both of the operands of the numbers on which the arithmetic operations is taking place is a kind of number that the microcode does not handle. The system first coerces the operands to a uniform type and puts them in a uniform place on the stack. Thereafter a quick external macrocode routing for doing this type of operation on that type is called. If the result is not to be returned to the stack, an extra return address must be set up so that when the operation routine returns, it returns to another quick external routine which moves the result to the right place.

Stack buffers traps occur when there is a stack buffer overflow. The trap routine does the necessary copying between the stack buffer and the main memory. It is handled as a trap to macrocode rather than being entirely in microcode, because of the possibility of recursive traps, when refilling the stack buffer it is possible to envoke the transporter and take page faults. When emptying the stack buffer, it is possible to get unsafe pointer traps.

MEMORY CONTROL

Figure 7:
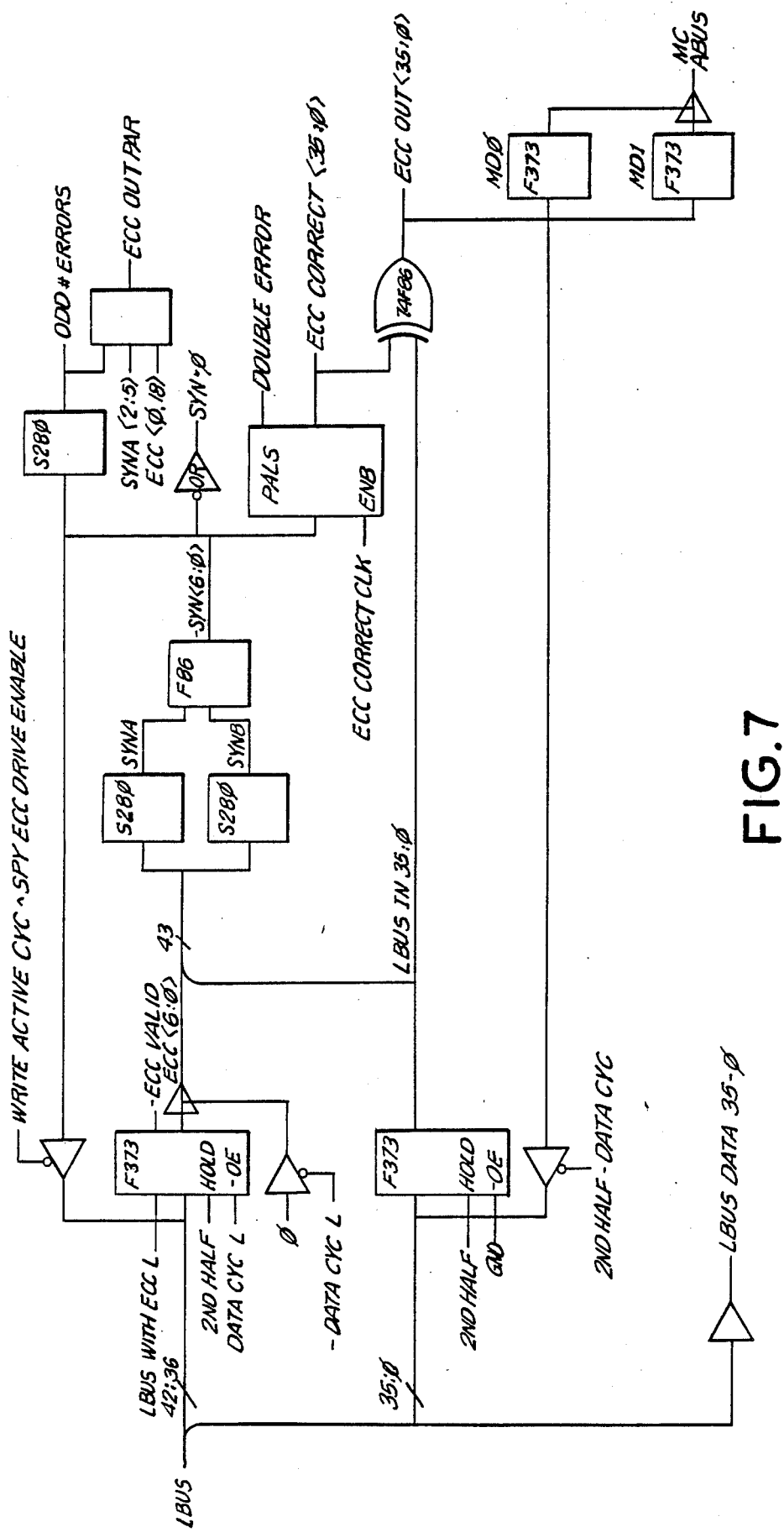
FIG. 7 is a block diagram of the memory control of FIG. 1.
Figure 8:
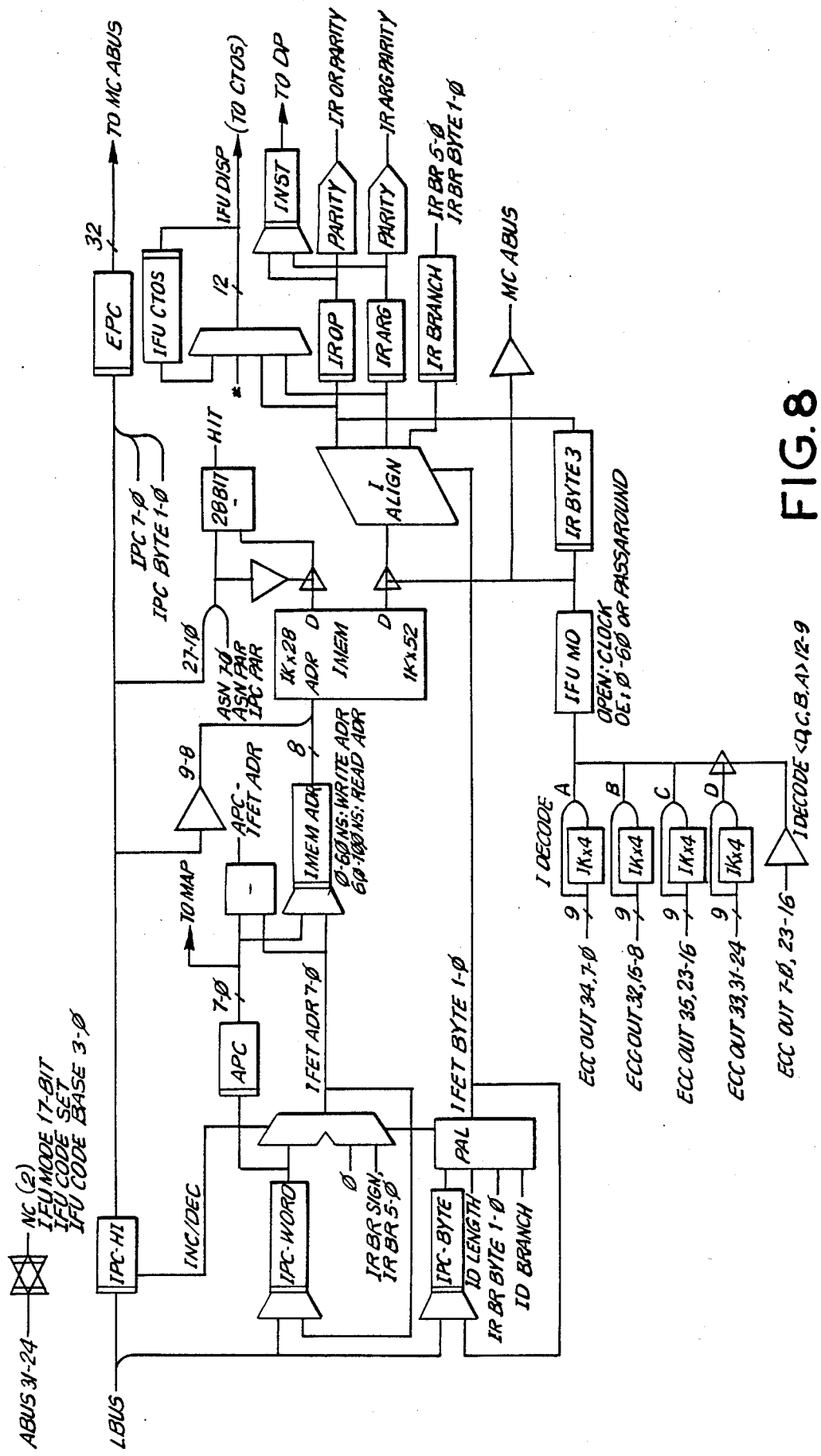
FIG. 8 is a data path diagram of the memory control instruction fetch unit.
Figure 9:
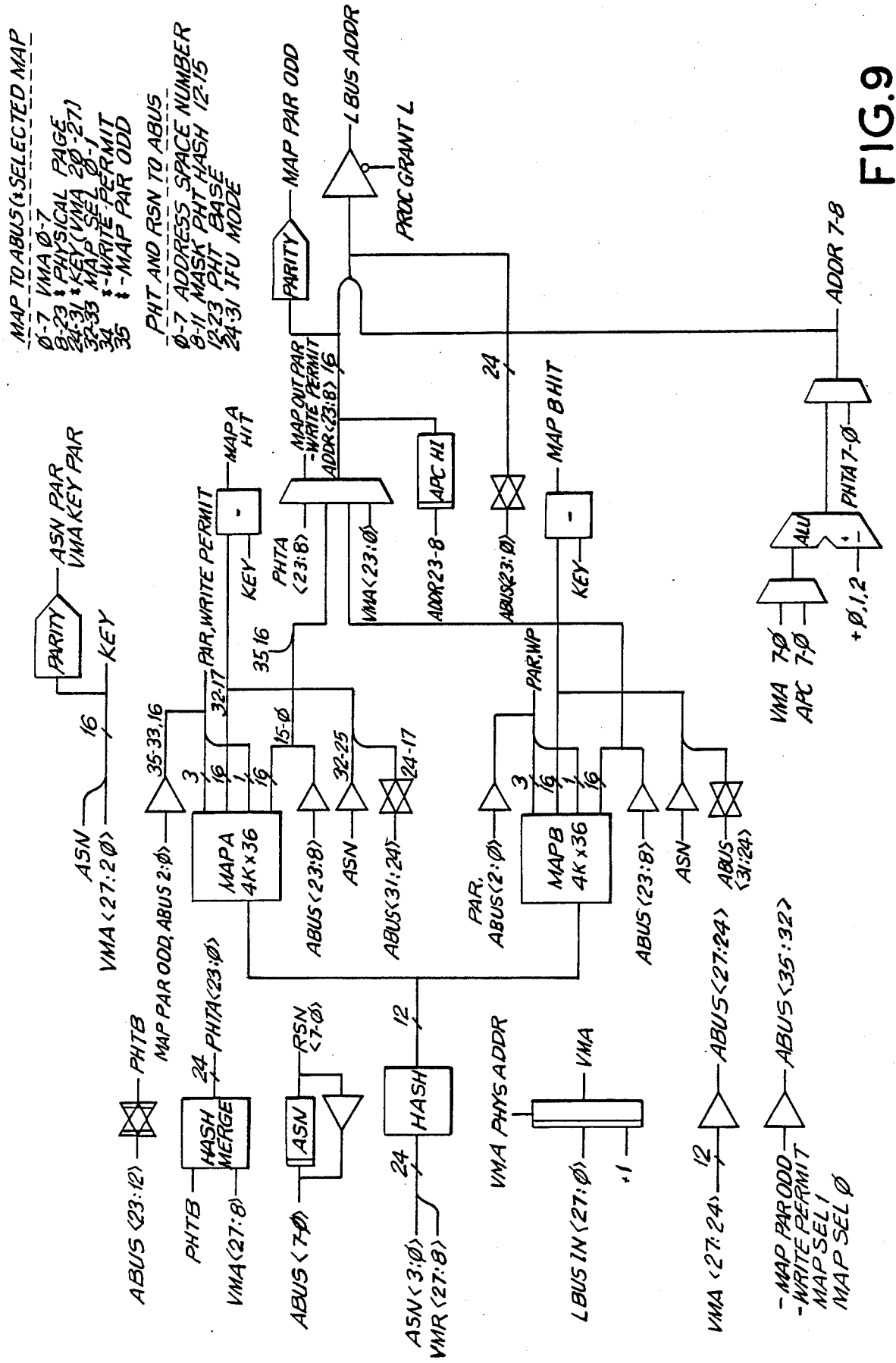
FIG. 9 is a block diagram of the memory control map circuitry.

The memory control is shown in block diagram form in FIGS. 7-9 which show the data and error correction circuitry in FIG. 7, the data path flow of the instruction fetch unit in FIG. 8 and the page hash table mapping in FIG. 9.

Physical memory is addressed in 44-bit word units. This includes 36 bits for data, 7 bits for error correction code (ECC) plus one bit spare. Double-bit errors are automatically detected, while single-bit errors are both detected and corrected automatically. The memory is implemented using 200-ns 64Kbit dynamic RAM (random access memory) chips with a minimum memory configuration of 256Kwords (1MByte) (See FIGS. 10-23). The write cycle is about 600 ns (three bus cycles). In some cases the system can get or set one word per cycle (200 ns), and access a word in 400 ns.

The system 28-bit virtual address space consists of 16 million (16,777,216) 44-bit wide words (36-bits of data and 8 bits of ECC and spares). This address space is divided into pages, each containing 256 words. The upper 20 bits of a virtual address are called the Virtual Page Number (VPN), and the remaining 8 bits are the word offset within the page. Transfers between main and secondary memory are always done in pages. The next section summarizes the operation of the virtual paging apparatus.

The virtual memory scheme is implemented via a combination of Zetalisp code and microcode. The labor is divided into policies and mechanisms. Policies are realized in Zetalisp; these are decisions as to what to page, when to page it, and where to page it to. Mechanisms are realized in microcode; these constitute decisions as to how to implement the policies.

Zetalisp pointers contain a virtual address. Before the hardware can reference a Zetalisp object, the virtual address must be translated into a physical address. A physical address says where in main memory the object is currently residing. If it is not already in main memory, it must either be created or else copied into main memory from secondary memory such as a disk. Main memory acts as a large cache, referencing the disk only if the object is not already in main memory, and then attempting to keep it resident for as long a it will be used.

In order to quickly and efficiently translate a virtual address into a 24-bit physical address, the system uses a hierarchy of translation tables. The upper levels in the hierarchy are the fastest, but since speed is expensive they also can accommodate the fewest translations. The levels used are:

Dual Map Caches which reside in and are referenced by the hardware and can each accommodate 4K entries.

A Page Hash Table Cache (PHTC) which resides in wired main memory and is referenced by the microcode with hardware assist. The size of the PHTC is proportional to the number of main memory pages, and can vary from 4 to 64Kwords, requiring one word per entry. However, the table is only 50% dense to permit a reasonable hashing performance.

A Page Hash Table (PHT) and Main Memory Page Table (MMPT) which reside in wired main memory and are referenced by Zetalisp. The size of both of these tables are proportional to the number of main memory pages, with the PHT being 75% dense and the MMPT 100% dense. Both tables require one word per entry. The PHT and MMPT completely describe all pages in main memory.

The Secondary Memory Page Table (SMPT) describes all pages of disk swapping space, and dynamically grows as more swapping space is used.

A virtual address is translated into a physical address by the hardware checking the Map Caches for the virtual page number (VPN). If found, the cache yields the physical page number the hardware needs. If the VPN isn't in the Map Cache, the hardware hashes the VPN into a PHTC index, and the microcode checks to see if a valid entry of the VPN exists. If it does, the PHTC yields the physical page number. Otherwise a page fault to Zetalisp code is generated.

The page fault handler checks the PHT and MMPT to determine if the page is in main memory. If so, the handler does whatever action is required to make the page accessible, loads the PHTC and the least recently used of the two Map Cache, and returns. If the page is not in main memory, the handler must copy the page from disk into a main memory page. When a page fault gets to this point it is called a hard fault. A hard fault must do the following:

1. Find the virtual page on the disk by looking up the VPN in the SMPT.
2. Find an available page frame in main memory. An approximate FIFO (first-in, first-out) pool of available pages is always maintained with some pages on it. When the pool reaches some minimum size a background process fills it by making the least recently used main memory pages available for reuse. If the page selected for reuse was modified (that is, its contents in main memory were changed so the copy on disk is different) it must be first copied back to disk prior to its being available for reuse. The background process minimizes this occurrence at fault time by copying modified pages back to disk periodically, especially those eligible for reuse.
3. Copy the disk page into the main memory page frame.
4. If the area of the virtual page has a "swap-in quantum" specified, the next specified number of pages are copies into available main memory page frames as well. If these prefetched pages are not referenced within some interval and some page frames are needed for reuse, their frames will be reused. This minimizes the impact of prefetching unnecessary pages.
5. Update the PHT, MMPT, PHTC, and least recently used of the two Map Cache to contain the page just made resident, and forget previous page whose frame was used.
6. Return from the fault and resume program execution.

The central Memory Control unit manages the state of the bus and arbitrates requests from the processor, the instruction fetch unit, and the front-end processor.

L BUS

For general communication with devices, the L bus acts as an extension of the system processor. Main memory and high speed peripherals such as the disk, network, and TV controllers and the FEP are interfaced to the L bus. The address paths of the L bus are 24 bits wide, and the data paths are 44 bits wide, including 36 bits for data and 8 bits for ECC. The L bus is capable of transferring one word per cycle at peak performance, approximately 20MByte/sec.

All L bus operations are synchronous with the system clock. The clock cycle is roughly 5 MHz, but the exact period of cycle may be tuned by the microcode. A field in the microcode allows different speed instructions for different purposes. For fast instructions, there is no need to wait the long clock cycle needed by slower instructions. Main memory and cpu operations are synchronous with the L bus clock. When the cpu takes a trap, the clock cycle is stretched to allow a trap handler microinstruction to be fetched.

As an example of L bus operation, a normal memory read cycle includes three phases:
1. Request—The cpu or the FEP selects the memory card from which to read (address request).
2. Active—The memory card access the data; the data is strobed to an output latch at the end of the cycle.
3. Data—The memory card drives the data onto the bus; a new Request cycle can be started.

In a normal write operation, two phases are carried out:
1. Request—The cpu or the FEP selects the memory card to which to write.
2. Active—The cpu or the FEP drives the data onto the bus.

A modified memory cycle on the L bus is used for direct memory access operation by L bus devices. In a DMA output operation, as in all memory operations, the data from memory is routed to the ECC logic. However, instead of passing on to the processor's instruction prefetch unit, the data is shipped to the DMA device (e.g., FEP, disk controller, network controller) that requested it.

For block mode operation, the L bus uses pipelining techniques to overlap several bus requests. On block mode memory writes, an address may be requested while a separate data transfer takes place. On block mode memory reads, three address requests may be overlapped within one L bus cycle.

TABLE 4

MEMORY AND CLOCK SIGNALS. (From <LMIFU>MC.)

The bus is used in three ways: accessing memory, accessing I/O device registers which look like memory, and accessing "MicroDevices". MicroDevices are distinguished because they are addressed by a separate 10-bit field which comes directly from the microcode, and do not follow the 3 cycle Request/Active/Data protocol of memories. One example of such a device is a DMA device such as the disk; the DMA task microcode commands the disk to put data onto the bus or take it off, while doing a memory cycle. We'll call the three classes of responders "Memory, MemoryDevices, and MicroDevices."

All transactions on the L-bus are synchronous with the system clock. For example, memory responds to requests with a 2 or 3 cycle sequence, viz:

On the first cycle (Request), the processor puts an address on LBUS ADDR, puts the type of cycle on LBUS WRITE, and asserts LBUS REQUEST. All the memory cards compare the high bits of the LBUS address with their slot number. The selected memory card drives the row address onto the RAM address lines, and at the leading edge of LBUS CLOCK starts RAS. After a delay it muxes the column address onto the RAM address lines, and finally at the clock boundary CAS is enabled.

The second (Active) cycle is used to access the RAM: on a read the RAM output is strobed into a latch at the end of the cycle; on a write, the bus has the write data and ECC bits and the RAM WE is driven by a gated Lbus Clock (late write operation). RAS and CAS are reset at the end of this cycle.

During the third (Data) cycle, the latched read data is driven on the bus (during First Half), the RAM chips precharge during their RAS recovery time, and possibly a new Request cycle occurs.

The bus clock is designed so that the memory card can start RAS with the leading edge and start CAS with the trailing edge and be guaranteed of meeting the RAM timing specs. No other use is intended for the leading edge of clock. It is suggested that MemoryDevices initiate response to requests at the trailing edge of clock.

The clock seen by devices on the bus (LBUS CLOCK) is a version of the clock that drives the processor. Its frequency is roughly 5 Mhz but the exact period of each cycle may vary between 180-260 ns depending on the cycle length specified by the microcode. Although the processor controls the cycle length, LBUS CLOCK is unaffected by any clock inhibit conditions in the processor -- operations on the bus proceed independently of the microcode, once they have been initiated. Memory data error-correction will also extend the clock for some period of time.

An exception to this is when the processor takes a trap. In that case LBUS CLOCK is stretched -- the extra time occurs in the second (or high) phase. While the main clock is held high, the clock and sequencer conspire to perform a second cycle internally that fetches the trap handler microinstruction. Because of this, two first-half clocks will happen for only one LBUS CLOCK. If the extended cycle is a Data cycle, the processor will latch the data seen during the first first-half.

Note: The leading edge of FIRST HALF is >>not<< the same as the trailing edge of LBUS CLOCK. First-half is primarily intended as a timing signal that controls enabling data from memories onto the bus. The only other nefarious use you are allowed is to clock something with the mid-cycle edge of FIRST HALF, and then you should be prepared to see two of them on some cycles.

A central Memory Control manages the state of the bus and arbitrates between requests from the processor, IFU, and FEP. Both Memory and MemoryDevices are expected to conform to the same timing protocol.
[document FEP/MC arbitration].

Any MemoryDevices (like the TV) that are unable to respond in 3 cycles must assert LBUS WAIT during the Active cycle until they can respond. The memory control state will proceed on the first Active cycle where LBUS WAIT is not asserted. LBUS WAIT should not be present on any other cycle, and must be developed early enough to propogate the length of the bus, go through a xcvr, and gate the clock. DMA devices also watch LBUS WAIT, so they know which cycle is the one that they should read or write the data.

Block mode operations. In some cases the processor issues a series of requests on back-to-back cycles. This is called "block mode". A new request can be started each cycle. When a block-mode operation in underway, the bus is segmented into a 3-stage pipeline, one stage for addressing, one stage for ram access, and one stage for data transfer (on reads).

The addresses of block mode requests are always in increasing sequential order, although any pattern that avoids referencing addresses [n, n+4] in adjacent cycles would be OK. The existing memory card interleaves on bits 18,1,0, so an individual ram always see at least 4 cycles between requests for sequential locations.

MemoryDevices also have to handle block mode requests, because the microcode will not in general want to distinguish references to MOS memory from MemoryDevices. This means that the device must be prepared to accept a request during its "active" cycle. Request cycles are unconditional, there is no way for a device to reject or delay a request. The cycle following a request is the active cycle, which can be repeated (via LBUS WAIT) until the device is ready to accept data (on writes) or enter the data cycle (on reads).

LBUS <43:0> - Bi-directional data bus, active high tri-state.
    LBUS <43:36> are the ECC bits. Driven by processor or FEP
    on write Active cycles. Driven by memories on read Data
    cycles. Also used to transfer data between processor and
    Devices. Also is used to carry the Obus signals from the data
    path card (E) to the other cards in the processor (I and C).

LBUS ADDR <23:0> - Physical address. Tri-state driven from
    processor or FEP. A physical address of 24 bits is
    semi-consistent with allowing a maximum of 31 physical slots,
    each of which could hold 512K words of memory.

LBUS CLOCK +/- -- Differential ECL system clock.

LBUS FIRST HALF +/- -- differential ECL timing signal from memory control.
    Used during Data cycles to enable memory data onto the bus.
    The memory card drives data onto the bus during the first half
    of the cycle, the memory control reads the bus data and does
    error correction. During the second half cycle, the corrected
    data is driven on the bus from the memory control.
    Memories must insure that data is driven out on the bus as
    soon as possible after the leading edge of FIRST HALF, because
    the memory control needs most of the first half to decode the
    ECC syndrome.

LBUS REQUEST L - Request for Memory or MemoryDevices addressed by
    Bus.Address. Stable by leading edge of Bus.Clock with enough
    time for address compare and 2 levels of logic.
    LBUS REQUEST L and LBUS WRITE L, along with the address, are
    asserted towards the end of the first cycle of a transaction.
    The data are transferred during the second or third cycle.
    The request, write, and address lines are not valid during
    those cycles (indeed they may be used to start another transaction).

LBUS WRITE L - from the processor or FEP. The write data will be
    driven onto the bus during the next cycle. Otherwise, the
    requested cycle is a read, and the memory will drive the bus
    during the 2nd succeeding cycle.

LBUS WITH ECC - From Memories that don't have ECC bits. Driven during
    Data cycle.

LBUS WAIT L - From MemoryDevices. Asserted for as many cycles as
    necessary to hold memory control in Active cycle state. Must
    be valid early in the cycle.

LBUS REFRESH L - All dynamic RAM memories perform a refresh.
    All rows of memory refresh at once. The memory array bypass
    capacitors hold enough charge to supply the RAMs for the
    refresh cycle, so the transient shouldn't be seen by the power
    supply. The refresh timer and address counter is in the
    Memory Control, it has nothing to do with micro-tasking so
    that the memories will continue to get refreshed when the
    processor is being single stepped.

LBUS ID REQUEST L - Requests that the selected board supply information
    about itself. The board selection is by matching
    LBUS ADDR <23:19> against the slot number (see below).
    LBUS <7:0> are driven with one of 32 bytes of data selected
    by LBUS ADDR <6:2>. The format of these data bytes is not
    yet specified, but generally includes the board type, board
    serial number, board revision level, and a checksum sensitive
    to failures of the data and address lines.

Note that memory refreshing may take place, using LBUS ADDR
    <17:18>, while a board ID is being read using the other
    address lines. The PROM data should be driven onto the bus
    for as long as ID REQUEST is asserted. (The memory card is
    slightly strange in that it "buffers" LBUS ADDR <6:2> through
    the same latch that it uses to hold the column address during
    normal memory cycles. This latch is open during LBUS CLOCK,
    so the memory board doesn't produce correct data until the
    second cycle after ID REQUEST and LBUS ADDR are present. The
    FEP compensates for this, and other boards shouldn't
    necessarily emulate the memory card.

SLOT NUMBERING

LBUS SLOT <4:0> - a slot number built into the backplane. These pins
are grounded in a different pattern at each slot; if the board plugged
into that slot provides pullups it will see a unique slot number.
This is matched against LBUS ADDR <23:19> for Memory, MemoryDevice,
and IDRequest operations, and against LBUS DEV <9:5> for MicroDevice
operations, to select the desired board. LBUS SLOT <4> is actually
bussed across each card cage, and is grounded in the main card cage
and left floating in the extension cage. More discussion of this below.

RESET SIGNALS

LBUS RESET L - general reset line. This is brought low when power is turned
on, and whenever the FEP feels like asserting it.

LBUS POWER RESET L - brought low when power is not valid. This line is used
to protect disks and to perform initializations only needed when first
powering on. When the machine is powered up, this line is grounded and
remains grounded until the FEP validates the power and cooling and turns it
off. This line is also grounded before turning off the power.

MICRODEVICE SIGNALS

LBUS DEV <9:0> - a device address for microdevice operations. Bits <9:5>
select a board, by matching against the slot number. The special slot
numbers 36 and 37 are used to select the FEP and MC boards, respectively.
Bits <4:0> select a register or operation within the board.

LBUS DEV READ L - commands the device to put data onto the Lbus data lines.

LBUS DEV WRITE L - commands the device to take data from the Lbus data lines.

at the LBUS CLOCK. Note that when LBUS DEV WRITE is used to inform the device
of a DMA memory cycle being started, the Lbus data lines contain unrelated
data perhaps associated with an unrelated memory read. LBUS DEV WRITE L should
only be depended upon at the clock edge; it should not be used to gate the clock.
If the microinstruction doing the microdevice write is NOPed by a trap or by
a control-memory parity error (e.g. a microcode breakpoint), LBUS DEV WRITE L
will be asserted for a period of time, past the leading edge of the clock, and
will then be deasserted some time before the trailing (active) edge of the clock.

LBUS DEV COND L - the selected device may ground this line (with an
open-collector nand gate) to feed a skip condition to the microcode.

Microdevice I/O is used for general communication with devices, for internal
communication within the processor complex (including the FEP), and for
control of DMA operations.

For general communication with devices, the Lbus simply acts as an extension
of the processor's internal bus. Data are transmitted within a single cycle
and clocked at the trailing edge of the clock.

Microdevice read and write to slot number 36 is used for communication with
the FEP, the page tags, and the microsecond clock. Microdevice read and
write to slot number 37 is used for communication with the MC and SQ
boards. (It is used when reading and writing the NPC register in the SQ
board in order to reserve the Lbus and connect it to the datapath; the
control signals to the SQ board are transmitted separately.)

DMA works as follows. The device requests a task wakeup when it wants to
transfer a word to or from memory. The microcode task wakes up for 2
cycles. The first cycle puts the address on the Lbus address lines, makes
a read or write request to memory, and also increments the address. The
second cycle decrements the word count, to decide when the transfer is
done. The microcode asserts DISMISS during the first cycle (the task
switch occurs after the second cycle.) The device is informed of the DMA
operation by the microcode through the use of a microdevice write during
the first cycle. This microdevice write does not transfer any data to the
device, but simply tells it that a DMA operation is being performed, and
clears its wakeup request flag. (The wakeup request is removed from the
bus immediately, and the flag is cleared at the clock edge.) For a read
from device into memory, the device puts the data on the bus during the
active cycle (one cycle after the microdevice write) and it is written into
memory. For a write, the device takes data from the bus two cycles after
the microdevice write.

Some devices look like memory, rather than using microdevice I/O. The
criterion for which to use is generally whether the device is operated
by special microcode, and the convenience and need for speed of that microcode.
Devices that look like memory can be accessed directly by Lisp code.

SPY SIGNALS

SPY <7:0> - an 8-bit, bidirectional, rather slow bus used for diagnostic
purposes. Allows the FEP to read and write various cpu state while the
machine is running.

SPY ADDR <5:0> - addresses the diagnostic register to be read or written

SPY READ L - gates data from the selected register onto the spy bus.

SPY WRITE L - clocks data from the spy bus into the selected register, on
the trailing edge.

SPY DMA SIGNALS

When the spy bus isn't being used for diagnostics, the FEP uses it as a
special side-door path to certain DMA devices. Normally the FEP uses it
to receive a copy of all incoming network packets; it can also set it up
to transmit to the network and to read from the disk (possibly also to
write the disk; this is unclear and not yet determined). Details are
in <LMHARD>DMA.DESIGN; that part of that file is said to be up to date.

SPY <7:0> - 8 bits of data to or from DMA device. These lines are
continuously driven during DMA operations; the FEP's DMA buffer does
not latch them.

SPY DMA ENB L - asserted if DMA operations are permitted to take place;
deasserted if the spy bus is being used for diagnostic purposes.

SPY DMA SYNC↑ - a clock, asserted by the device. On the rising edge of
this a byte is transferred and the address is incremented. The device
must take the data (for write) or supply the new data (for read) on or
before the leading edge of this. This is the same wire as SPY ADDR 0.

SPY DMA BUSY L - asserted if the DMA operation has not yet completed.
This can be asserted by the device or the FEP or both, depending on who
determines the length of the transfer. For example, for network input
this comes from the device, while for network output and disk input
it comes from the FEP (the disk doesn't know it's own block size).
This is the same wire as SPY ADDR 1.

Timing Requirements

LBUS RESET and LBUS POWER RESET are asynchronous. All other side-effects should take place at the trailing edge of the clock. LBUS REQUEST and the address lines are stable before the leading edge of the clock. LBUS WRITE however is only valid at the trailing edge of the clock; it can change as the result of a trap. Consequently it is illegal for memory reads to have side-effects, as memory reads not requested by the program can occur.

In a microdevice write, the address lines (LBUS DEV 0-9) are stable throughout the cycle, however the data (LBUS 0-35) and LBUS WRITE itself are only valid at the trailing edge of the clock. The data lines are only driven during SECOND HALF.

In a microdevice read, the address lines (LBUS DEV 0-9) are stable throughout the cycle, however LBUS READ itself is only valid at the trailing edge of the clock; side-effects are permitted but may only happen at the clock. The data (LBUS 0-35 or in some devices LBUS 0-31) should be driven throughout the cycle.

TASK 8-15 REQ and TASK 4 REQ are asynchronous and may be driven at any time. Once a task is requested, it should stay requested until explicitly dismissed or until LBUS RESET. When a task is dismissed, the task request must be deasserted during the cycle that is dismissing, so that a new task of presumably lower priority can be scheduled. The task request flip flop however must not be cleared until the trailing edge of the clock, the time when all side-effects occur. During the cycle after a dismiss the task request will not be looked at by the processor, however the device should deassert its request as quickly as it can (a glitch is expected at the beginning of the cycle).

Data driven onto the Lbus data lines (LBUS 0-43) must be synchronized to the processor clock; failure to observe this rule can cause every sort of internal parity error in the processor as well as memory ECC errors. When reading from memory, the data must be stable on the bus as early as possible, to allow time for the ECC-error decision before the end of FIRST HALF. Memory read data are driven onto the bus during FIRST HALF, and then latched by the processor during SECOND HALF. This latch is followed by a second one, that is opened during the middle of FIRST HALF to pick up the raw data, and again during the middle of SECOND HALF to pick up the ECC-corrected data (if any). ("Middle" is controlled by PROC UP). Even devices that deassert LBUS WITH ECC must provide the data early enough to avoid synchronizer failure in either of these latches.

When reading from a microdevice, there is more timing leeway since the microcode knows the specific device it is reading from and can use a slow-first-half cycle. Also there is no ECC computation. The microdevice drives the data lines during the first half and the processor effectively clocks them at the trailing edge of FIRST HALF (actually there is one latch open during FIRST HALF followed by a second latch open during SECOND HALF; this is done for hardware minimization reasons). The device data must be stable early enough to avoid synchronizer failure in these latches. The microcode will use a slow-second-half cycle if necessary, since it does not see the data until SECOND HALF. Lbus data lines not driven by a microdevice will be brought to 1 by the terminator, but not quickly enough to avoid problems. Thus all microdevice reads must drive at least LBUS 0-33.

Note that when doing a memory read, the data are driven two clocks after the request (skipping LBUS WAIT cycles); the bus-driver enable should come from a clocked register. When doing a microdevice read, the data are driven by LBUS DEV READ gated by matching of LBUS DEV ADDR 9-5. LBUS DEV READ takes some time after the beginning of the cycle to become stable, and the device should introduce as little additional delay as it can. The device should only drive the bus during FIRST HALF, so that it turns off in plenty of time before the next cycle.

When writing into memory from a DMA device, the data, including the ECC code added by the memory control, must be stable at the memory chips before the leading edge of the clock (which is when WRITE is asserted to the RAMs).

When a cycle is extended because of a trap, so that FIRST HALF happens twice, the latch through which the processor receives Lbus data is only opened during the first FIRST HALF. When a cycle is repeated because of LBUS WAIT, memory-read data are only received from the bus during the first instance of the cycle. (This only happens when a block read is done from a device that uses LBUS WAIT, since only in a block read can an active cycle and a data cycle coincide, and LBUS WAIT is associated with active cycles.) Microdevice-write and memory-write data are driven during throughout an extended or repeated cycle (microdevice-write data are only driven during SECOND HALF).

The leading edge of FIRST HALF does not precede the trailing edge of the clock. It is not a good idea to depend on this. The trailing edge of FIRST HALF preceeds the leading edge of the clock.

LBUS WITH ECC is driven with the same timing requirements as the data lines.

LBUS DEV COND must be stable before the trailing edge of the clock.

SPY ADDR 5-0 are stable whenever SPY READ or SPY WRITE is asserted. The SPY data lines should be clocked by the trailing edge of SPY WRITE, and should be driven whenever SPY READ is asserted. If a bidirectional transceiver is used to bring the SPY bus onto a board, its direction should be controlled by SPY READ, so that it will not glitch at the trailing edge of SPY WRITE; the FEP latches the SPY lines before it deasserts SPY READ. The FEP allows a long time [?? ns] for a spy read or write, so slow logic may be employed on this bus.

```
LBUS ADDR 0-11        AA1-12       DP SQ- MC* AU- FEP* BUS

LBUS ADDR 12-23       AA13-24      MC* AU- FEP* BUS

U TYPE MAP SEL 0-5    AA13-18      DP SQ*

SPY READ DP ID L      AA19         DP SQ*

U XYBUS SEL           AA20         DP SQ*

U STKP COUNT          AA21         DP SQ*

U OBUS CDR 0-2        AA22-24      DP SQ*

U OBUS HTYPE 0-2      AA25-27      DP SQ*

LBUS ID REQUEST L     AA25         MC- AU- FEP* BUS

LBUS BLOCK REQUEST L  AA26         MC* AU- FEP- BUS-

LBUS DEV READ L       AA27         MC* AU- FEP BUS

U OBUS LTYPE SEL      AA28         DP SQ*

LBUS DEV WRITE L      AA28         MC* AU- FEP BUS

LBUS DEV COND L       AA29         DP- SQ MC- AU- FEP- BUS*

FEP CONTINUITY        AA30         DP SQ MC AU FEP*
     Asserted by the FEP and read back on the other continuity lines
     to detect the presence of processor boards (and in the correct slots).

MC CONTINUITY         AA31         DP- SQ- MC* AU- FEP
     Jumpered to FEP CONTINUITY on the MC card.

SQ CONTINUITY         AA32         DP- SQ* MC- AU- FEP
     Jumpered to FEP CONTINUITY on the SQ card.

LBUS 0-29             AC1-30       DP* SQ MC* AU FEP* BUS*

DP CONTINUITY         AC31         DP* SQ- MC- AU- FEP
     Jumpered to FEP CONTINUITY on the DP card.

AU CONTINUITY         AC32         DP- SQ- MC- AU* FEP
     Jumpered to FEP CONTINUITY on the AU card.

SPY 0-7               BA1-8        DP- SQ* MC* AU* FEP* BUS*

SPY ADDR 0-5          BA9-14       DP- SQ MC AU FEP* BUS
     SPY ADDR 0-1 also used for FEP-DMA

SPY READ L            BA15         DP- SQ MC AU FEP* BUS

SPY WRITE L           BA16         DP- SQ MC AU FEP* BUS

SPY DMA ENB L         BA17         FEP* BUS (spare)               BA17         DP- SQ- MC- AU- TASK 4 REQ L          BA18         DP- SQ MC- AU- FEP- BUS*
     Low-priority task wakeup LBUS DEV 0-9          BA19-28      DP SQ* MC AU- FEP BUS
U AMWA 0-9
     Note that these lines have two names, since they serve as both the
     Lbus microdevice address and some datapath control signals. The same
     wires are bussed all the way through both the processor and the Lbus.

LBUS FIRST HALF +,-   BA29,BC29    FEP* BUS
     Terminate with 68 ohms to -2V at end of BUS.

(spare)               BA29,BC29    DP- SQ- MC- AU-

TASK 8-9 REQ L        BA30,BC30    DP- SQ MC AU- BUS*
     (See below; listed here since they fall here in pin order)
```

```
(spare)                  BA31              DP- SQ-

-COND                    BC31              DP* SQ*

EXTERNAL REQUEST L       BA31              MC- *** BUS*
EXTERNAL GRANT L         BC31              MC* *** BUS-
    Traces between SQ and MC should be cut. These will have
    to be jumpered around the AU and FE slots.

LBUS CLOCK +,-           BA30,BC30         FEP*
                         BA32,BC32         BUS
    Terminate with 68 ohms to -2V at end of BUS.
    Note that these signals change pin number at the FEP.

PROC CLOCK +,-           BA32,BC32         DP SQ MC AU
                         BA31,BC31         FEP*
    Separately-driven duplicate of LBUS CLOCK.
    Terminate with 68 ohms to -2 V at DP end.
    Note that these signals change pin number at the FEP.

LBUS 30-35               BC1-6             DP* SQ MC* AU FEP* BUS*

LBUS 36-43               BC7-14            MC* AU FEP* BUS*

DP TRANSPORT TRAP L      BC7               DP* SQ
    Asserted if a trap is required for garbage-collector processing
    of the data being read from memory (a function of the data type
    and the high-order address field).

DP TYPE TRAP             BC8               DP* SQ
    Asserted if the type map calls for a trap (bad data type or
    invisible pointer).

DP TRAP PARAM 0-3        BC9-12            DP* SQ
    Trap parameter (dispatch code for arithmetic trap, trap number
    for type trap).

DP SLOW JUMP L           BC13              DP* SQ
    Asserted if a non-NOPing trap is required (used by the stack
    garbage collector that doesn't exist yet).

DP MISC TRAP             BC14              DP* SQ
    IOR of trap conditions other than the above.

LBUS WITH ECC            BC15              MC AU- FEP BUS*

AMEM PAR ERR L           BC15              DP* SQ
    Parity error in A-memory; stops machine (spare)                  BC16              DP- SQ- MC- AU- FEP- BUS-
    Spare Lbus line LBUS POWER RESET L       BC17              DP SQ MC AU FEP* BUS
    Terminate somehow. May need to be brought out to power supply?
    (May go to front panel also, but FEP will provide that connection.)

TASK 8-15 REQ L          BA30,BC30,BC18-23    DP- SQ MC- AU- FEP- BUS*
    TASK 8-9 REQ L are not connected to the FEP.

LBUS REQUEST L           BC24              MC* AU- FEP* BUS

TYPE PAR ERR L           BC24              DP* SQ
    Parity error in type map

LBUS WRITE L             BC25              MC* AU- FEP* BUS

GC MAP PAR ERR L         BC25              DP* SQ
    Parity error in garbage-collector address-space-quantum map

LBUS REFRESH L           BC26              MC- AU- FEP* BUS

BMEM PAR ERR L           BC26              DP* SQ
    Parity error in B-memory; stops machine

LBUS WAIT L              BC27              DP SQ- MC AU- FEP BUS*

LBUS RESET L             BC28              DP SQ MC AU FEP* BUS

PROC WP +,-              CA1,CC1           DP SQ MC AU FEP*
    Write-pulse for internal static RAMs; occurs twice per cycle.
    Terminate with 68 ohms to -2 V at DP end.

PROC FIRST HALF +,-      CA2,CC2           DP SQ MC AU FEP*
    Separately-driven duplicate of LBUS FIRST HALF.
    Terminate with 68 ohms to -2 V at DP end.
```

```
CLK EXTEND CYCLE        CA3             DP* SQ- MC* AU- FEP
    A wired-OR ECL signal, asserted when extra time is needed for a trap.
    Terminate with 100 ohms to -2 V at DP end and on FEP.

CLK CS PRESET L         CA4             DP SQ- MC- AU- FEP*
    Forces chip-select for A,B memories on at the beginning of the cycle,
    until there has been enough time for the pass-around decision.
    (Saves a few nanoseconds).

SQ NEXT INST L          CA5             DP SQ* MC AU- FEP-
    Asserted if this is the last microinstruction for this
    macroinstruction.

U AMRA 0-5              CA6-11          DP SQ*

FEP LBUS RQ L           CA6             MC AU- FEP*
    Asserted if FEP wants the bus or is using it (active cycle).

REFRESH RQ L            CA7             MC AU- FEP*
    Asserted if time for a memory refresh, or refresh active cycle.

MC ECC DELAY            CA8             MC* AU- FEP
    Extends the clock during the second half in order to provide
    time for single-bit error correction.
    This is an ECL signal.

DOUBLE ECC ERROR L      CA9             MC* AU- FEP
    True if there is an uncorrectable error in the data for this
    memory read.

(unknown)               CA10-11         MC AU- FEP

U AMRA 6-11             CA12-17         DP SQ* MC AU(-?)

U AMRA SEL 0-1          CA18-19         DP SQ* MC AU(-?)

U AMWA 10-11            CA20-21         DP SQ* MC AU(-?)

U AMWA SEL 0-1          CA22-23         DP SQ* MC AU(-?)

U MAGIC 0-3             CA24-27         DP SQ* MC AU

U SPEC 0-4              CA28-32         DP SQ* MC AU

CLK WD ENB L            CC3             DP SQ- MC- AU- FEP*
    Another timing signal for A,B memory.

DP SET GC TAG L         CC4             DP* SQ- MC- AU- FEP
    Registered output from the GC map indicating that the
    Abus datum is a pointer to a temporary space. This sets
    a GC page tag bit if main memory is being written.

NOP L                   CC5             DP SQ* MC AU FEP-
    Asserted if the current microinstruction should not do
    anything, because the processor is stopped, stalled, or
    trapping (valid late, should not be used to gate the clock).

U SPEED 0-1             CC6-7           DP- SQ* MC- AU- FEP

CLK EXTRA INNINGS       CC8             DP- SQ MC- AU- FEP*
    Asserted during the second cycle of a trap.

TASK 3 REQ              CC9             DP- SQ MC- AU- FEP*
    Task wakeup from the FEP MC PROC NORMAL GRANT L  CC10            DP SQ- MC* AU- FEP
    Asserted if the LBUS ADDR lines contain an address derived
    by mapping the VMA to a physical address. This signal enables
    the DP card to capture the mapped address for possible later
    use in addressing A-memory. Also used by the page tag memory.

PAGE TAG PAR ERR L      CC11            DP- SQ MC- AU- FEP*
    Parity error in page tag memory; stops machine.

SPARE ERROR L           CC12            DP- SQ MC- AU-
    Grounding this halts the machine after completing the current microinstruction;

(spare)                 CC13-15         DP- SQ- MC- AU-
    Bus these across processor (except FEP) and maybe we'll
    find a need for them.

INST 0-7                CC16-23         DP MC*
    Low 8 bits of the current macroinstruction.
    Note: these lines are wired around the SQ slot.

U AU OP 0-7             CC16-23         SQ* AU
    Microcode control for the AU.
    [This assumes 8 more bits of control memory are wedged in.]
    Note: these lines are wired around the MC slot.
```

```
AU STOP L                    CC24            SQ AU*
     Any error on the AU that needs to stop the mchine.
     Note: this line is wired around the MC slot.

(spare)                      CC25-28         SQ- AU-
     Connect these between the SQ and AU for possible future use
     Note: these lines are wired around the MC slot.

SEQUENCE BREAK               CC24            DP* MC
     Macrocode interrupt request.
     Note: this line is wired around the SQ slot.

MC COND                      CC25            DP MC*
     A microcode skip condition.
     Note: this line is wired around the SQ slot.

MC OBUS TO LBUS L            CC26            DP MC*
     Enables the datapath output to drive the Lbus
     Note: this line is wired around the SQ slot.

MC OBUS REG TO LBUS L        CC27            DP MC*
     Enables the datapath result from the previous microinstruction
     to drive the Lbus (used when writing main memory)
     Note: this line is wired around the SQ slot.

MC ADDR IN AMEM L            CC28            DP MC*
     Indicates that the VMA maps to an A-memory address
     Note: this line is wired around the SQ slot.

MC ABUS 32-35                CC29-32         DP* SQ- MC* AU*
     Data bus between DP, MC, and AU.

MC ABUS 0-31                 DC1-32          DP*
                             DA1-32          MC* AU*
     Bidirectional data bus between DP, MC, and AU.
     Note: this is wired around the SQ slot.
     Note: this is on the "C" column at the DP, but the "A" column
     elsewhere.

U BMRA 0-7                   DA1-8           DP SQ*

U BMWA 0-3                   DA9-12          DP SQ*

U BMEM FROM XBUS             DA13            DP SQ*

U COND FUNC 0-1              DA14-15         DP SQ*

U COND SEL 0-4               DA16-20         DP SQ*

U BYTE F 0-1                 DA21-22         DP SQ*

U ALU 0-3                    DA23-26         DP SQ*

DISPATCH 0-3                 DA27-30         DP* SQ
     Contents of field being dispatched on (spare)                      DA31-32         DP- SQ- (spare)                      DC1-4           SQ- MC- CUR TASK 0-3                 DC5-8           SQ* MC
     Task in which the current microinstruction is executing TASK SWITCH L                DC9             SQ* MC
     Asserted if the next microinstruction will be from a different task WANT NEXT INST               DC10            SQ* MC
     Asserted if the address supplied by the IFU in the previous cycle
     is actually being used as the next microinstruction address.
     Stalls the processor if the address was not valid after all.

MC WAIT                      DC11            SQ MC*
     Asserted if the processor must stall and wait for the Lbus MC MAP MISS L                DC12            SQ MC*
     Asserted if a map-miss trap should be taken MC TRAP PARAM 0-1            DC13,14         SQ MC*
     Modifiers for trap address MC TASK*INHIBIT L            DC15            SQ MC*
     Inhibits a task switch after the next instruction.

MC STOP L                    DC16            SQ MC*
     Any parity error on MC board; stops processor.
```

```
IFU DISP 2-13            DC18-28          SQ MC*
    Control-memory address of the first microinstruction to execute
    the next macroinstruction (spare)                  DC29-30          SQ- MC- U MEM 2-0              - DC17,DC31-32     SQ* MC
    Memory-control control field
    Bit 2 is not next to the other bits for historical reasons Pins OC1-32 on the AU slot are left unconnected for possible cabling
to a second board or other expansion.

Pins CA11-32, CC12-32, DA1-32, DC1-32 on the FEP slot are left unconnected
for paddleboard use.
```

A main goal of the system architecture is to execute one simple macroinstruction per clock tick. The instruction fetch unit (IFU) supports this goal by attempting to prefetch macroinstructions and perform microinstruction dispatching in parallel with the execution of previous instructions.

The prefetch (PF) part of the IFU fills a 1Kword instruction cache, which holds the 36-bit instruction words. Approximately 2000 17-bit instructions can be held in the instruction cache. The instructions have a data type (integer). The IFU feeds the cache takes the instructions, decodes them, and produces a microcode address. There is a table which translates a macroinstruction onto an address of the first microinstriction.

At the end of the clock tick the processor decides whether it needs a new instruction or it should continue executing microcode.

The system instruction set corresponds very closely to Zetalisp. Although one never programs directly in the instruction set one will encounter the instruction set when using the Inspector or the Window Error Handler. The instructions are 17 bits long. Seven instruction formats are used:

1. Unsigned-immediate operand—This format is used for program-counter-relative branches, immediate fixnum arithmetic, and specialized instructions such as adjusting the height of the stack.
2. Signed-immediate operand—The operand is an 8-bit two's complement quantity. It is used in a similar manner as the unsigned-immediate format.
3. PC-relative operand—This is similar to signed-immediate, with the offset relative to the program counter.
4. No-operand—If there are any operands, they are not specified, since it is assumed they are on the top of the stack. Also used by many basic Zetalisp instructions.
5. Link operand—This specifies a reference to a linkage area in a function header.
6. @Link operand—This specifies an indirect reference to a stack frame area associated with a function.
7. Local operand—The operands are on the stack or within a function frame. This format is used for many basis Zetalisp instructions.

Many instructions address a source of data on which they operate. If they need more than one argument, the other arguments come from the stack. Examples include PUSH (push source onto the stack), ADD (add source and the top of stack), and CAR (take the car of the source and push it onto the stack). These instructions exist in several formats.

There is no separate destination field in the system instructions. All instructions have a version which pushes onto the stack. Additional opcodes are used to specify other destinations.

The following categories of instructions are defined for the system:

Data motion instructions—The instructions move data without changing it. Examples include PUSH, POP, MOVEM, and RETURN.

Housekeeping instructions—These are used in message-passing, function called, and stack manipulation. Examples include POP-N, FIX-TOS, BIND, UNBIND, SAVE-BINDING-STACK-LEVEL, CATCH-OPEN, and CATCH-CLOSE.

Function calling instructions—These use a non-inverted calling sequence; the arguments are already on the stack. Examples include CALL, FUNCALL, FUNCALL-VAR, LEXPR-FUNCALL, and SEND.

Function entry instructions—These are used within functions that take more than four arguments or have a rest argument, and hence do not have their arguments set up by microcode. Examples include TAKE-N-ARGS, TAKE-N-ARGS-REST, TAKE-N-OPTIONAL-ARGS, TAKE-N-OPTIONAL-ARGS-REST.

Function return instructions—These return values from a function. The main opcode 9 is RETURN, with some variations.

Multiple value receiving instructions—These take some number of values off the stack. Example: TAKE-VALUES.

Quick function call and return instructions—These are fast function calls. Example: POPJ.

Branch instructions—Branches change the flow of program control. Branches may be relative to the program counter or to the stack.

Predicates—These include standard tests such as EQ, EQL, NOT, PLUSP, MINUSP, LESSP, GREATERP, ATOM, FIXP, FLOATP, NUMBERP, and SYMBOLP.

Arithmetic instructions—These perform the standard arithmetic, logical, and bit-manipulation operations. Examples include ADD, SUBTRACT, MULTIPLY, TRUNC2 (this does both division and remainer), LOGAND, LOGIOR, LOGXOR, LDB, DPB, LSH, ROT, and ASH.

List instructions—Many Zetalisp list-manipulation instructions are microcode directly into the system. Examples are CAR, CDR, RPLACA, and RPLACD.

Symbol instructions—These instructions manipulate symbols and their property lists. Examples include SET, SYMEVAL, FSET, FSYMEVAL, FBOUNDP, BOUNDP, GET-PNAME, VALUE-CELL-LOCATION, FUNCTION-CELL-LOCATION, PROPERTY-CELL-LOCATION, PACKAGE-CELL-LOCATION.

Array instructions—This category defines and quickly manipulates arrays. Examples include AR-1, AS-1, SETUP-1D-ARRAY, FAST-AREF, ARRAY-LEADER, STORE-ARRAY-LEADER are used to access structure fields.

Miscellaneous instructions—These include pseudo data movement instructions, type-checking instructions, and error recovery instructions not used in normal compiled code.

The system instruction execution engine works using a combination of hardware and microcode. The engine includes hardware for the following functions:
Address computation
Type-checking
Rotation, masking, and merging of bit fiels
Arithmetic and logical functions
Multiplication and division
Result-type insertion To give an example of the instruction execution engine, a 32-bit add instruction goes through the following sequence of events.
Fetch the operands (usually from the stack); error correction logic (ECC) checks the integrity of the data; ECC does not add to the execution time if the data is valid.
Check the data type fields.
Assume the operands are integers and perform the 32-bit add in parallel with the data type checking (If the operands were not integers, trap to the microcode to fetch the operands and perform a different type of add).
Check for overflow (if present, trap to microcode).
Tag the result with the proper data type.
Push the result onto the stack.

There is no overhead associated with data type checking since it goes on in parallel with the instruction, within the same cycle.

Rather than having the ECC distributed on all of the boards of the system as shown in FIG. 1, a single centralized ECC is located on the memory control board. All data transfers into and out of the memory and on the Lbus pass through the single centralized ECC. The transfers between peripherals and the FEP during a micro DMA also pass through the centralized ECC on the way to the main memory.

FRONT END PROCESSOR

During normal operation, the FEP controls the low and medium-speed input/output (I/O) devices, logs errors, and initiates recovery procedures if necessary. The use of the FEP drastically reduces the real-time response requirements imposed directly on the system processor. Devices such as a mouse and keyboard can be connected to the system via the FEP.

The front end process also feeds a generic bus network which is interfaced through the FEP to the Lbus and which, by means of other interfaces are able to convert Lbus data and control signals to the particular signals of an external bus to which peripherals of that external bus type may be connected. An example of an external bus of this type is the multibus. The Lbus data and control signals are converted to a generic bus format independent of the particular external bus to be connected to and thereafter convert the generic bus format of data and control signals to that of the external bus.

Four serial lines are connected to the FEP. Two are high-speed and two are low-speed. Each one may be used either synchronously or asynchronously. One high-speed line is always dedicated to a system console. One low speed line must be dedicated to a modem. The baud rate of the low-speed lines is programmable, up to 19.2Kbaud. The available high-speed line is capable of speeds up to 1Mbaud. All four lines are terminated using standard 25-pin D connectors.

Real-time interrupts from the MULTIBUS are processed by the FEP. After receiving an interrupt, the FEP traps to the appropriate interrupt handler. This handler writes into a system communication area of the FEP's main memory, and then sends an interrupt to the system CPU. The system CPU reads the message left for it in the system communication area and takes appropriate action.

Interrupt processing is sped up by the use of multiple microcontexts stored in the system processor. This makes interrupt servicing faster, since there is no need to save a full microcontext before branching to the interrupt handler.

The FEP also has the ability to achieve processor mediated DMA transfers.

DMA operations from the system to the FEP may be carried out at a rate of 2MByte per second.

I/O device DMA interface (to FEP buffer and to Microcode Tasks)
FEP to device:
FEP fills buffer with data, arranged so that carry out of buffer address counter happens at right time for stop signal to device. FEP resets address counter to point to first word of data. FEP sets buffer mode to enable buffer data to drive the bus (SPY 7:0), sets device to tell it what operation, the face that it is talking to the FEP, and to enable it to drive the bus control signal SPY DMA SYNC.

Device takes a word of data off of the bus and generates a pulse on SPY DMA SYNC. The trailing edge of this pulse increments the address counter as well as clocking the bus into the device's shift register. A carry comes out of the address counter during this pulse if this is the last word (or near the last, depending on device); this carry clears SPY DMA BUSY which tells the device to stop.

When SPY DMA BUSY clears the FEP is interrupted.

Device to FEP:
For disk, which needs a stop signal, FEP arranges address counter so carry out will generate a stop signal. Network generates its own stop signal based on end-of-packet incoming. FEP resets address counter to point one word before where first word of data should be stored. FEP sets buffer mode to not drive the bus and to do writes into buffer memory, sets device to tell it what operation, the fact that it is talking to the FEP, to enable it to drive the bus from a register, and to enable it to drive the bus control signals SPY DMA SYNC and SPY DMA BUSY (if it is the net).

When device has a word of data, it generates a pulse on SPY DMA SYNC. Trailing edge of this pulse clocks the data into a register in the device, which is driving SPY 7:0, and increments the address counter, which reflects back SPY DMA BUSY (if device is the disk). The buffer control logic waits for address and data setup time then generates an appropriate write pulse to the memory.

When SPY DMA BUSY clears the FEP is interrupted.

To summarize device FET interface lines:

SPY 7:0

Bidirectional data bus. This is the same bus used for diagnostics.

SPY DMA ENB L

Asserted if the spy bus may be used for DMA. The FEP deasserts this when doing diagnostic reads and writes, to make sure that no DMA device drives the spy bus.

SPY DMA SYNC

Driven by selected device, trailing (rising) edge increments address counter and starts write timing chain. This is open-collector.

SPY DMA BUS L

An open-collector signal which is asserted until the transfer is over. This is driven by the device or the FEP depending on who decides the length of the transfer. (Probably the FEP drives it from a flip flop optionally set by the program, and cleared by the counter overflow.) The FEP can enable itself to be interrupted when SPY DMA BUSY is non-asserted.

An I/O or generic bus is used to set up the device's control registers to perform the transfer and to drive or receive the above signals. Note that all of the tristate enables are set up before the transfer begins and remain constant during the entire transfer.

Device to microtask:

The devices control resistors are first set up using the I/O bus and the state of the microtask is initialized (both its PC and its variables, typically address and word count). A task number is stored into a control register in the device.

When the device has a word of data, it transfers it to a buffer register and sets WAKEUP. This is the same timing as FEO DMA NEXT: WAKEUP may be set on either edge since the processor will not service the request instantaneously. If WAKEUP is already set, it sets OVERRUN, which will be tested after the transfer is over.

The processor decides to run the task (see below). During the first cycle, the task microcode specifies DISMISS: the device sees this, gated by the current task equals its assigned task number, and clears WAKEUP at the end of the cycle. DISMISS also causes the processor to choose a new task internally. The microcode also generates a physical address. The device also sees the microcode function DMA-WRITE, gates by current task equals device's task, and drives the buffer register onto the bus. The processor drives the ECC-syndrome part of the bus and sends a write command to the memory.

During the second cycle, the processor counts down the word count, and does a conditional skip which affects at what PC the task wakes up next time, depending on whether the buffer has run out.

During the cycle two cycles before the first task cycle, the device drives its status onto 3 or 4 special bus lines, which the microtask may have enables to dispatch on. This is used for such things as stopping on disk errors and stopping at the end of a network packet.

Microtask to device:

The device's control registers are first set up using the I/O bus, and the state of the microtask is initialized (both its PC and its variables, typically address and word count). A task number is stored into a control register in the device. WAKEUP is forced on so that the first word of data will be fetched.

When the device wants a word of data, it takes it from a buffer register and sets WAKEUP so that the microtask will refill the buffer register. At the same time it sets BUFFER EMPTY, and if it is already set, sets OVERRUN.

During the first cycle of the task, the microcode spcifies DISMISS, which clears wakeup. It also generates an address and specifies DMA-READ. In the second cycle the task decrements the word count. In the third cycle (task not running), the ECC-corrected data is on the bus; at the end of this cycle it is clocked into the buffer register and BUFFER EMPTY is cleared. DMA-READ anded with current task—device task is delayed through two flip-flops then used to enable this clocking of the holding register.

Task selection hardware (in device and processor):

Device has a task-number register and a WAKEUP flip/flop, which is set by the device and cleared by the DISMISS signal from the processor when the current task equals the device's task. This can be an R/S flip flop or a J/K with either the set or the clear edge-triggered depending on what the device wants; the processor doesn't care. In the device to microtask case above, WAKEUP was being used for the overrun computation, and therefore the clearing should be edge-triggered.

WAKEUP enables an open-collector 3-8 decoder which decodes the assigned task number and drives the selected TASK REQUEST n line to the processor.

The processor sends the following signals to the device in addition to the normal I/O bus and clock:

| | |
|---|---|
| CURRENT TASK | (the task which the executing microinstruction belongs to) |
| NEXT NEXT TASK | (2 clocks ahead of CURRENT TASK) |
| DISMISS | (current task says to clear wakeup) |
| TASK-SPECIFIC FUNCTION | (communication from microcode to device) |
| TASK STARTUP DISPATCH | (DMA-READ, DMA-WRITE decodes of this) |
| (communication from device to microcode, driven if NEXT NEXT TASK matches assigned task) | |

The processor synchronizes the incoming TASK REQUEST lines into a register, clocked by the normal microcode clock. The register is ANDed with a decoder which generates FALSE for the current task if DISMISS is asserted. The results go into a priority encoder. The output of the priority encoder is compared with current task. If they differ, and the microcode is asserted TASK SWITCH ENABLE, and the machine did not switch tasks in the previous cycle, then it switches tasks in this cycle. During the second half of the cycle, NEXT NEXT TASK is selected from thepriority encoder output rather than CURRENT TASK, and the state of that task is fetched. There doesn't appear to be a useful place to use a PAL here.

When DISMISS is done, WAKEUP does not clear until the end of the cycle, which means it is still set in the synchronizer register. However, the output of the priority encoder will never be looked at during the cycle after a DISMISS, since we necessarily switched tasks in the previous cycle.

Minimum delay from WAKEUP setting to starting execution of the first microinstruction of the task is two cycles, one to fetch the task state and one to fetch the microinstruction. This can be increased by up to one cycle due to synchronization, by one cycle due to just having switched tasks, and by more if there are higher-priority task requests or the current task is disabling tasking (e.g. tasking is disabled for one cycle during a memory access). Max delay for the highest priority task is then 5 cycles or 1 microsecond, assuming tasking is not disabled for more than one cycle at a time.

When the microcode task is performing a more complicated service than simple DMA, the WAKEUP flip/flop in the device must remain set until the last microinstruction to keep the task alive.

The FEP boots the machine from a cold start by reading a small bootstrap program from the disk, loading it into the system microcode memory, and executing it. Before loading the bootstrap program, the FEP performs diagnostics on the data paths and internal memories of the processor.

Error handling works by having the FEP report error signals from the system processor. If the errors come from hardware failures detected by consistency checks (e.g., parity errors in the internal memories) then the processor must be stopped. At this point the FEP directly tests the hardware and either continues the processor or notifies the user. If the error signals are generated by software (microcode or Zetalisp) then the FEP records the error typically, disk or memory errors).

Periodically, the system requests information from the FEP and records it on disk, to be used by maintenance personnel. Since the FEP always has the most recent error information, it is possible to retrieve it when the rest of the machine crashes. This is especially useful when a recent hardware malfunction causes a crash. Since the error information is preserved, it can be recovered when the processor is revived.

Functions are divided into three categories according to their real-time constraints:

Unit selection, seeking, and miscellaneous things like recalibration and error-handling are done by Lisp code. There are I/O device addresses (pseudo-memory) whic allow sending commands to thedisk drive and reading back its status (and its protocol, e.g. SMD, Priam). When formatting the disk, the index and sector pulses are directly read from the disk through this path and the timing relative to them is controlled by Lisp code or special formatting microcode.

Head selection is the same except that it is done by microcode rather than Lisp code so that an I/O operation may be continued from one track to the next in a cylinder without missing a revolution because of the delay in scheduling a real-time process to run some Lisp code.

Read/write operations are done by disk control hardware in cooperation with microcode. There is a state machine which generates the "control tag" signals to the drive (i.e. read gate and write gate), controls the requests to the microcode task to transfer data words into or out of main memory, and controls the ECC hardware.

When the FEP is using the disk, the first two functions above are performed by LIL code in the FEP; the third function is performed by the disk state machine in cooperation with the FEP's high-speed I/O buffer.

The disk state machine can select its clock from one of two unsynchronized clocks, both of which come from the disk. One is the servo clock and the other is the read clock, derived from the recorded data. Servo clock is always valid while there is a selected drive, it is spinning, and it is ready. Delays are always generated from the servo clock, not from the machine clock or one-shots.

The state machine is started by an order from the microcode, Lisp code, or the FEP and usually runs until told to stop. When an SMD is being used, most of the lines on the disk bus, including control tag, come from a register which must be set up beforehand, but the Read Gate and Write Gate lins are OR'ed in by the state macnine.

The state machine stops and sets an error flag if any of the following conditions occurs:
No disk selected (SMD)
Multiple disks selected (SMD)
Disk not ready (Priam)
Overrun (slow response from microcode)
An unexpected index or sector pulse
Writing the command register while the state machine is running These error checks prevent clobbering an entire track if the microcode dies for some reason and never sends the stop signal.

Other errors from the disk, such as Of Cylinder, are not checked for. Most drives all cause a fault if any error occurs while writing. The disk error status (including fault) is checked by microcode and by macrocode after the sector transfer is completed.

The state machine can hang if the clocks from the disk turn off for some reason. The macrocode should provide a timeout.

The following orders to the state machine exist, i.e. it has the following program in its memory:

Read: The state machine delays, turns on read gate, delays some more, changes from the internal clock to the disk bit clock, waits for async pattern, then reads data words and gives them to the microcode until told to stop. The stop signal is issued simultaneous with the acceptance of the third-to-last data word by the microcode task. After reading the last data word, the ECC is read, and the microcode task is awakened one last time as the state machine goes idle. The microcode reads the ECC-0 flag over the bus; the flag is 1 if no error occurred.

Read Header: The state machine waits for a sector pulse, delays, turns on read gate, delays some more, changes from the internal clock to the disk bit clock, waits for async pattern, reads one data word (a sector header), turns off read gate, and falls into the Read program. The header word is given to the microcode as data (32 bits of header and 4 bits of garbage); it is up to the microcode to do header-comparison to make sure that the proper section is being accessed. There is no ECC on the header, instead there are some redundant bits which the microcode checks in parallel with the real bits. In other words, the header consists of 6 bits of sector number, 6 bits of head number, 12 bits of cylinder number, and 4 bits of some hash function of the other bits, fitting into the 28-bit header stored in a DCW list.

"Memory-mapped" I/O is used for all functions excpet those relating to the DMA task. This allows the FEP to read from the disk simply by doing Lbus operations, with no need to execute microinstructions (the CPU however must be stopped or at least known not to be touching the disk itself). No provision is made for the FEP to use the disk when the Lbus is non-functional.

Command Register: This register directly controls the bus, tag and unit-select lines to the disk(s), provides a DMA task assignment, and selects a state-machine program to be executed. If the state machine is running when the command register is written, it is stopped with an error. Otherwise it may optionally be started (if bit 24 is 1). Writing the command register resets various error conditions. All bits in the command register may be read back. All bits in the command register except the low 8 are zeroed by Lbus Reset.

| | |
|---|---|
| 10:0 | Disk. bus. |
| 11 | Obus in |
| 15:12 | SMD: tage 3:0 |
| 19:16 | Unit number |
| 23:20 | Command opcode (selects state machine program) |
| 24 | Start. Starts state machine if 1. Reads back as -DISK IDLE (1 if state machine running). |
| 28:25 | Task. 8-15 selects that task, otherwise no task. |
| 29 | FEP using disk. Enables SPY bus DMA. |
| 30 | 32-bit mode (forces fixnum data type in high bits) |
| 31 | (spare) |

A task wakeup occurs if the state machine orders one, and whenever the state machine is not running. No task should be assigned by the command register when the state machine is not being used. A wakeup will always occur immediately when a task assignment is given.

Diagnostic Register

This register allows a program to disable the paddle board and simulate a disk, testing most of the logic with the machine fully assembled. This register iscleared when the machine is powered on.

| | |
|---|---|
| 0 | Read clock |
| 1 | Servo clock |
| 2 | Read data |
| 3 | Index |
| 4 | Sector |
| 7:5 | (spare) |
| Paddle Enable Register | |

This register is cleared when the machine is powered on. It allows the paddle board to be turned off. It is set to 10 for normal operation. The bits are:

| | |
|---|---|
| 0 | Paddle ID enable (paddleboard IO prom to disk bus) |
| 1 | Paddle disk enable (disconnect disk part of paddle board) |
| 2 | Paddle net enable (disconnect network part of paddle board) |
| 3 | Paddle power OK (enable disk to spin up) |
| Status Register | |

Reading this register reads the status of the selected drive, of the disk interface, and some internal diagnostic signals.

Overrun and Error are cleared by writing the command register (however writing the command register while the state machine is running will set Error and stop the state machine).

ROTATIONAL POSITION SENSING

This is a 16-bit register with 4 bits for each deive, containing the current sector number.

ERROR CORRECTION

If bit 15 of the status register is 0 after a read operation, an ECC error was detected. The error-correct state machine operation may be used to compute the error syndrome. The microcode task wakes up every 32 bits, simply to count the bits. After the state machine stops, the error correction register may be read:

| | |
|---|---|
| 10:0 | Error pattern |
| 15:11 | Bit number within the word |

DMA TRANSFERS

A microdevice write opeation is done during the address cycle. At the same time the sequencer is old to dismiss the task and the memory control is told to start the appropriate (read or write) DMA cycle. Bits in the Lbus device address are:

| | |
|---|---|
| 9:5 | card slot number |
| 4:3 | subdevice (0 - disk) |
| 2:0 | operation |
| Operations: | |
| 0 | write disk buffer directly (rev 2 and later) |
| 1 | dma cycle (start dma cycle without dismission) |
| 2 | dismiss, task acknowledge (just clear wakeup) |
| 3 | dismiss & dma cycle |
| 4 | dismiss (only) |
| 5 | kill disk task |
| 6 | dismiss, task acknowledge, set end flag |
| 7 | dma cycle & set end flag & dismiss |

Operation 3 is what is normally used. Operation 1 could allow transferring multiple words per task wakeup if there was more than 1 word of buffering: it is also probably needed by the microcode in order to start a DMA transfer for the disk while continuing to run the task.

Operation 2 is used for non-data-transfer task wakeups, such as the wakeup on sector pulse and the wakeups used to count words when doing ECC correction. It simply dismisses the task (clears wakeup), and also has different timing with respect to the Overrun error.

Operation 5 clears the disk task assignment, preventing further wakeups, clears control tag so that the next disk command can be given cleanly and also "accidentally" clears fep-using-disk and disk-36-bit-mode.

When reading from disk into memory, after the dma cycle with the end flap there will be two additional data words; the state machine will then read and check the ECC code and then stop.

When writing from memory to disk, the data word supplied with the end flag is the second-to-last data word in the sector; the state machine will accept one more data word, then write the ECC code after it, write a guard byte, and then stop. The same timing applies for read-compare.

For microdevice read, the bits in the Lbus device address are:

| | |
|---|---|
| 9:5 | card slot number |
| 4:3 | subdevice (0-disk) |
| 2:0 | operation (0 for disk - read data buffer). |

FIGS. 10-23 are schematics of a memory board having 512K by 44 bits of memory storage and constituting the main memory of the system according to the present invention.

Figure 10:
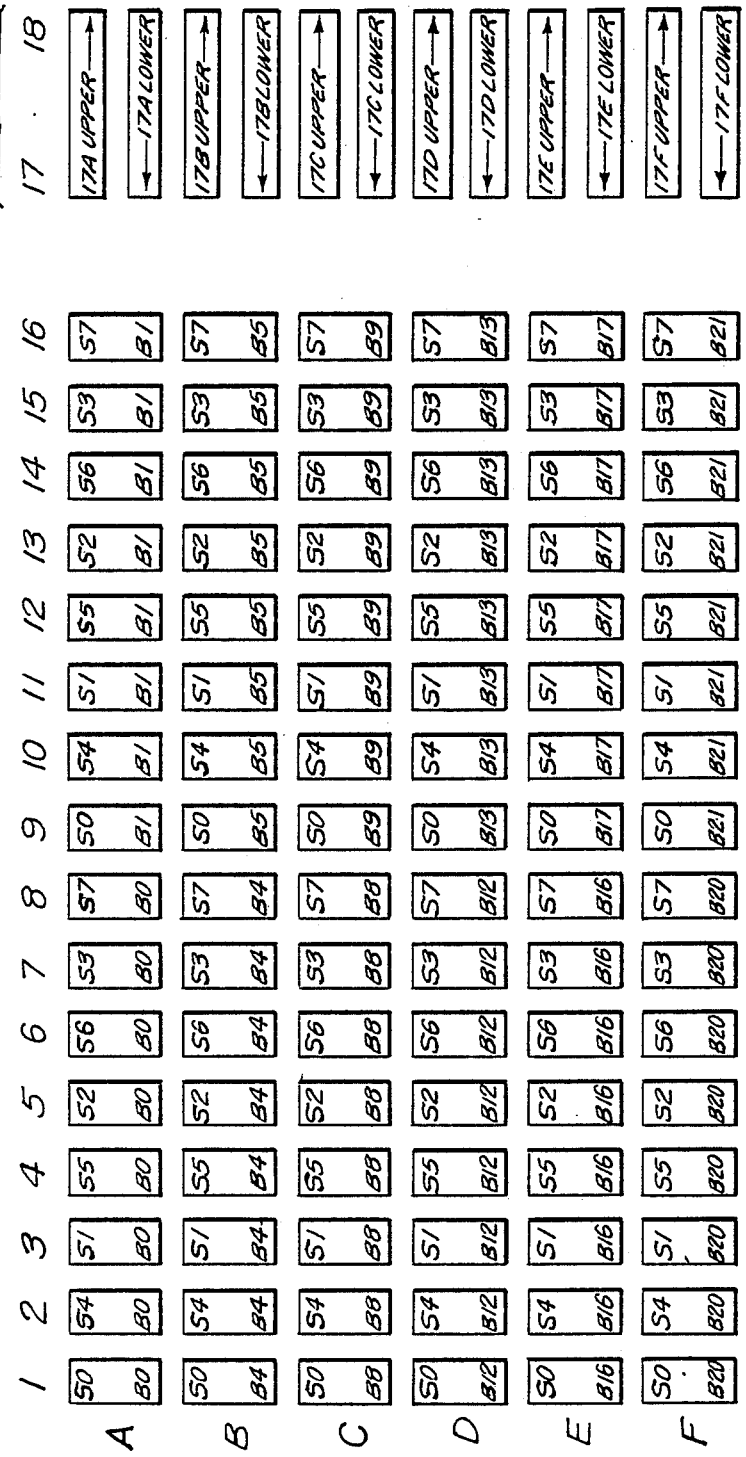
Figure 10:
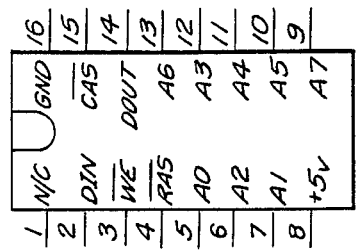

The memory comprises a board of 64K ram chips as shown in FIG. 10 and which are laid out on the memory board in the manner set forth in FIGS. 10-23, that is in Cols. 1-16 and 19-34 and rows A-M. The address drivers are centrally located in the columns marked 17 and 18 and alternatively drive the left and right or lower and upper memory devices. The read and write signals for the memory checks have been set forth with respect to the description of the Lbus timing modes earlier and will not be repeated herein.

Figure 11:
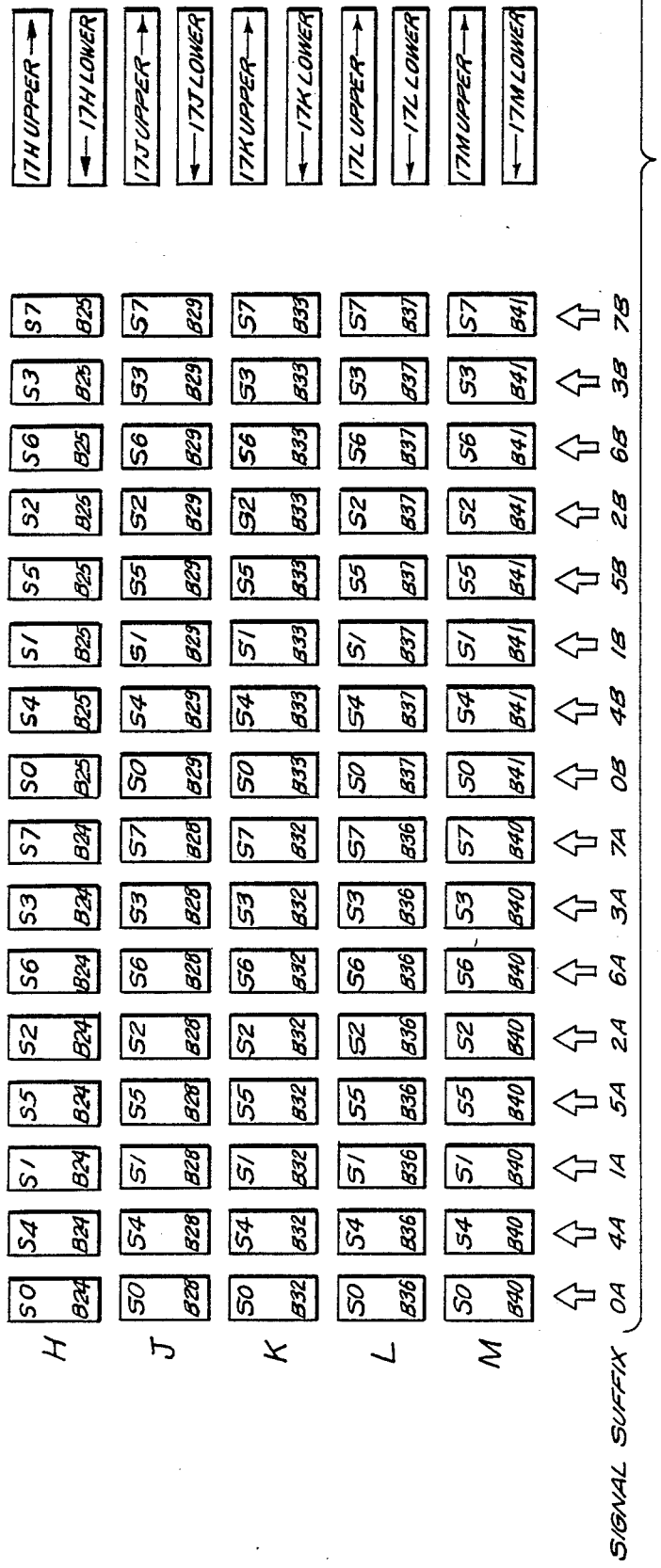
Figure 11:
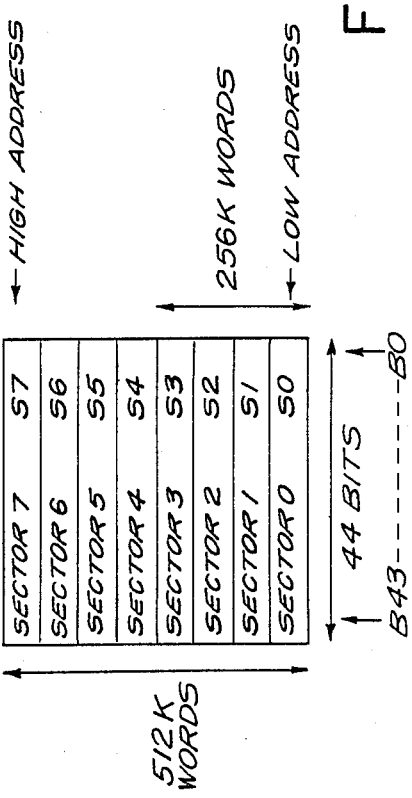
Figure 14:
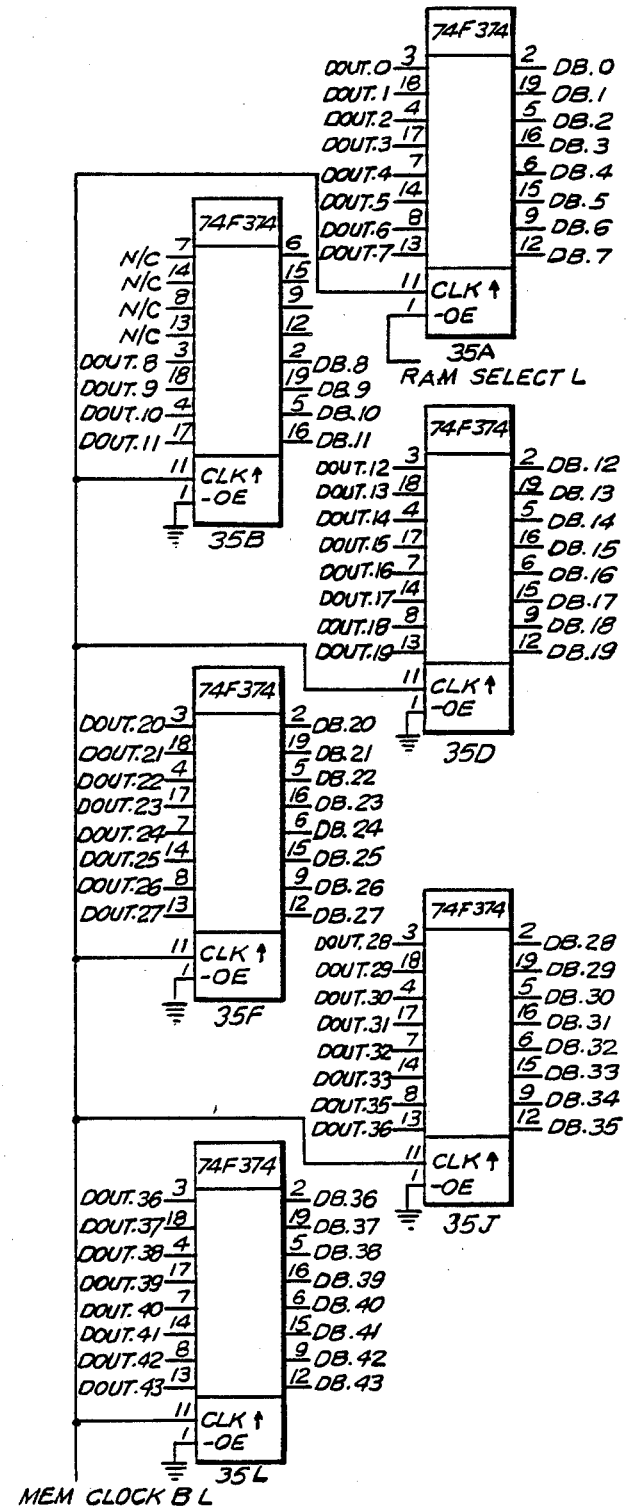

The memory is laid out so as to be interleaved with 19 bits of address. 8 bits of address are used to select a row, 8 bits of address are used to select a column and the three remaining bits of address data are used to select sectors 0 through 7 as shown in the lower left hand corner of FIGS. 11.

As a result of this interleaving configurationof the memory, with a judicious storage scheme under microcode control, it is possible to pipeline requests for data from the memory and write data into the memory in the block mode discussed hereinbefore.

Figure 15:
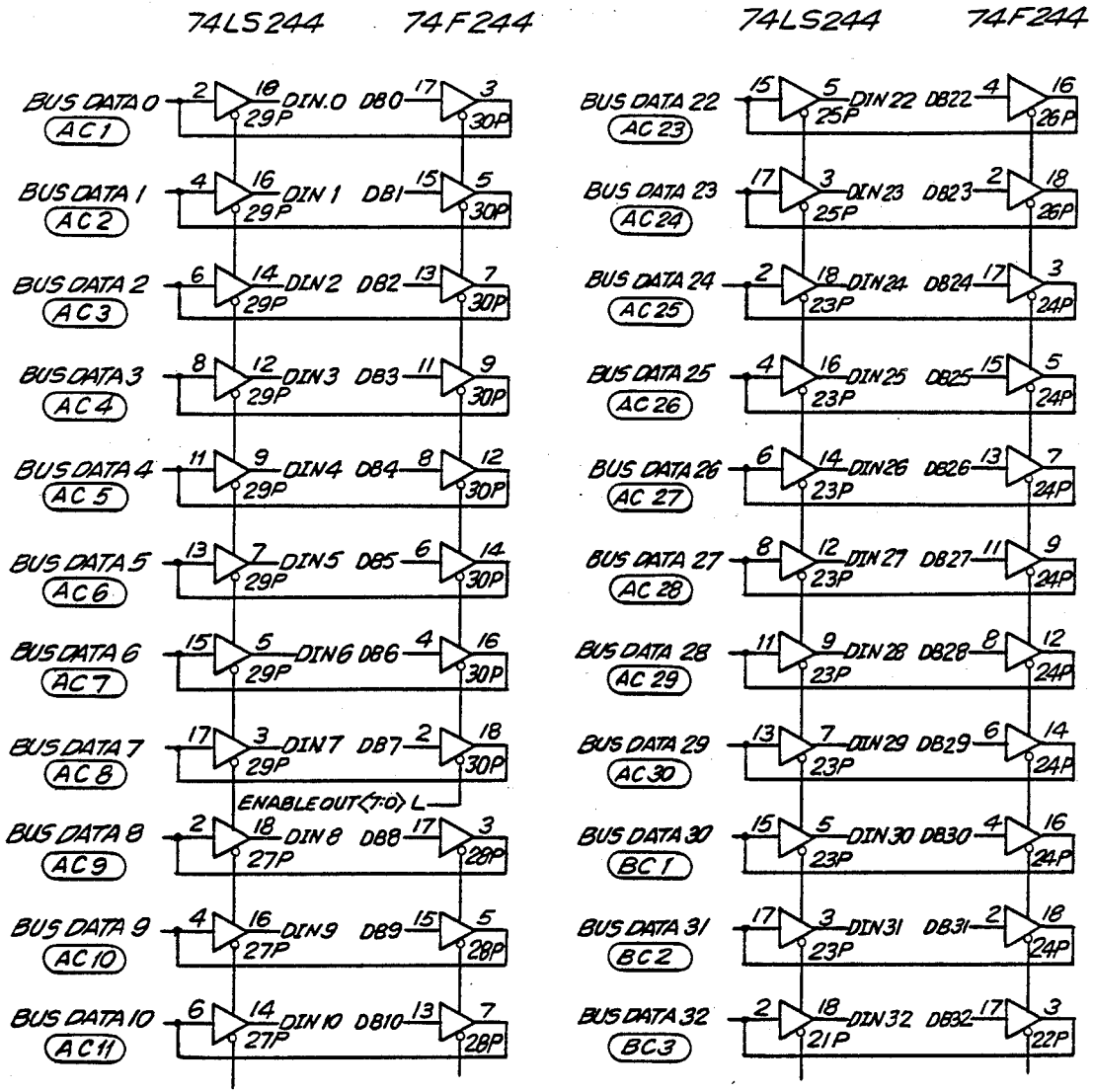
Figure 16:
Figure 17:
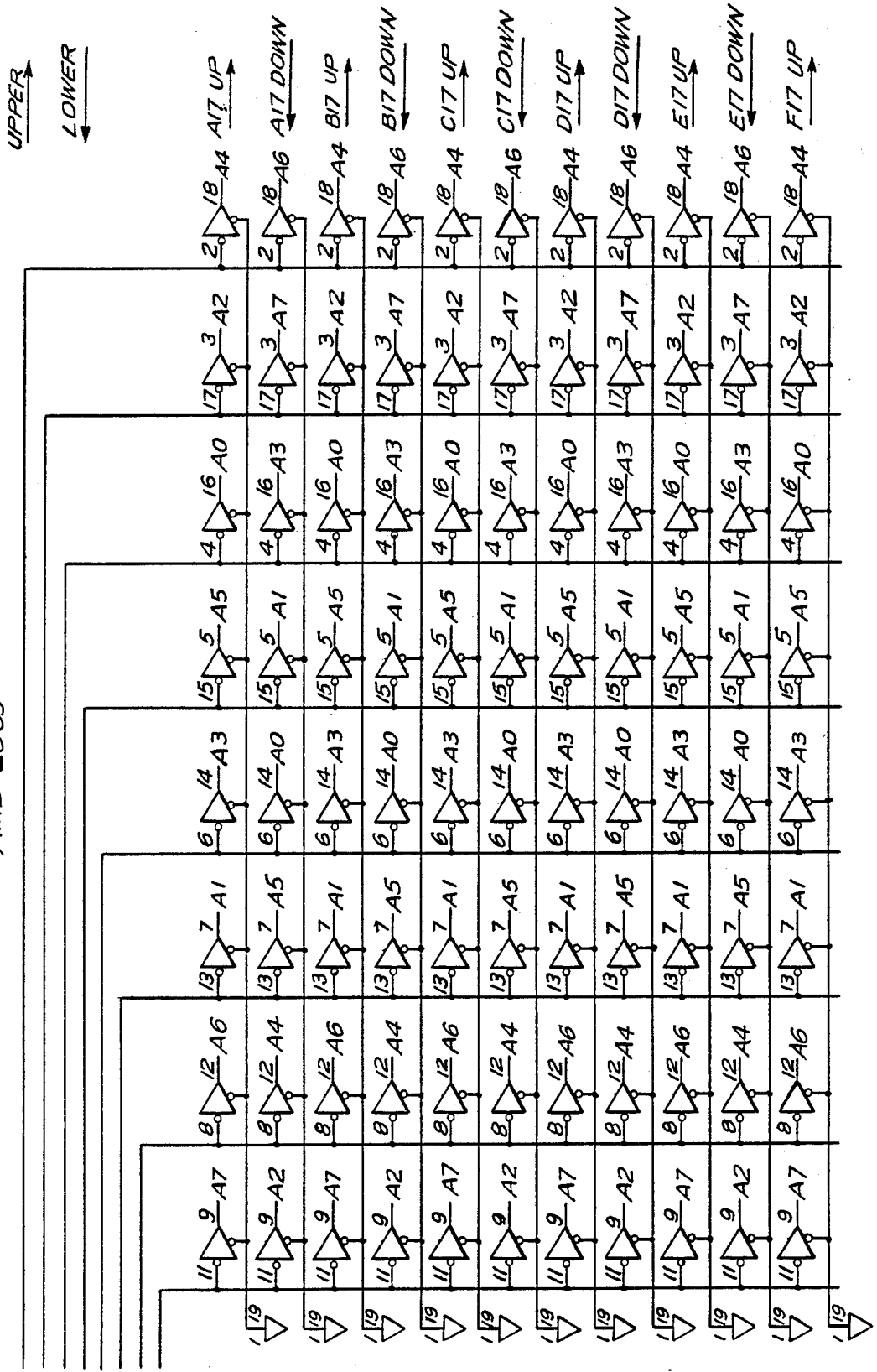
Figure 18:
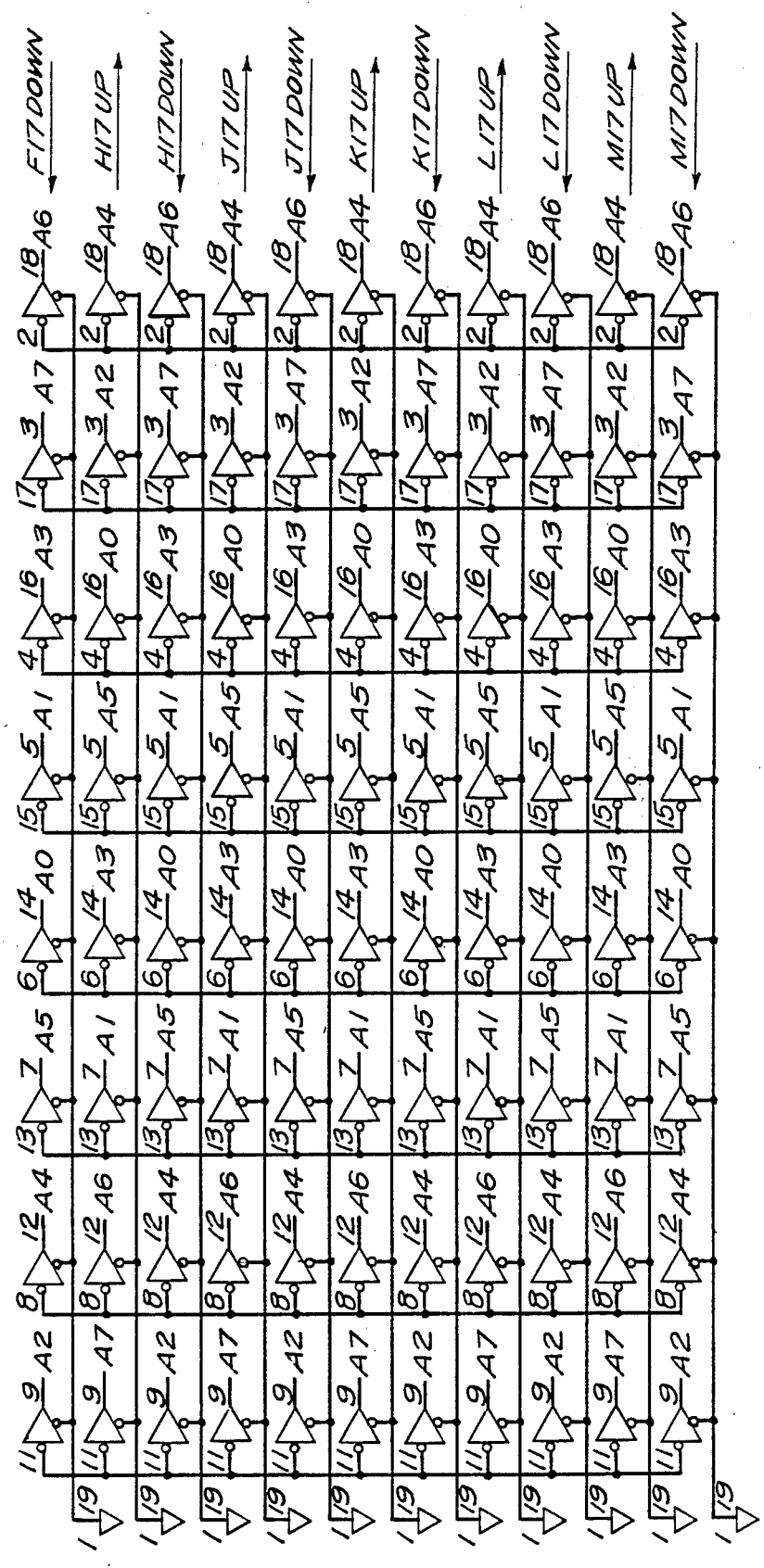
Figure 19:
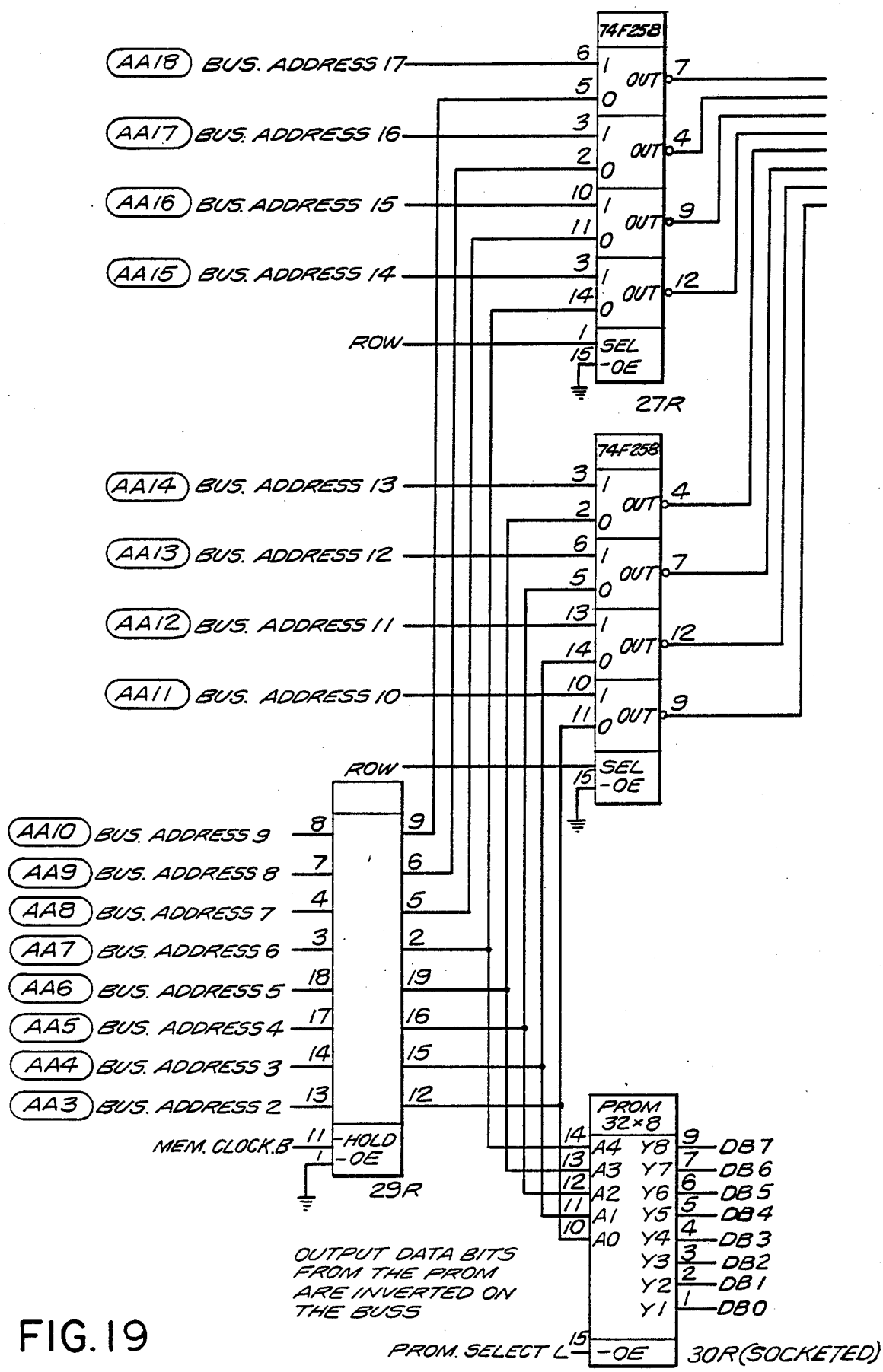
Figure 20:
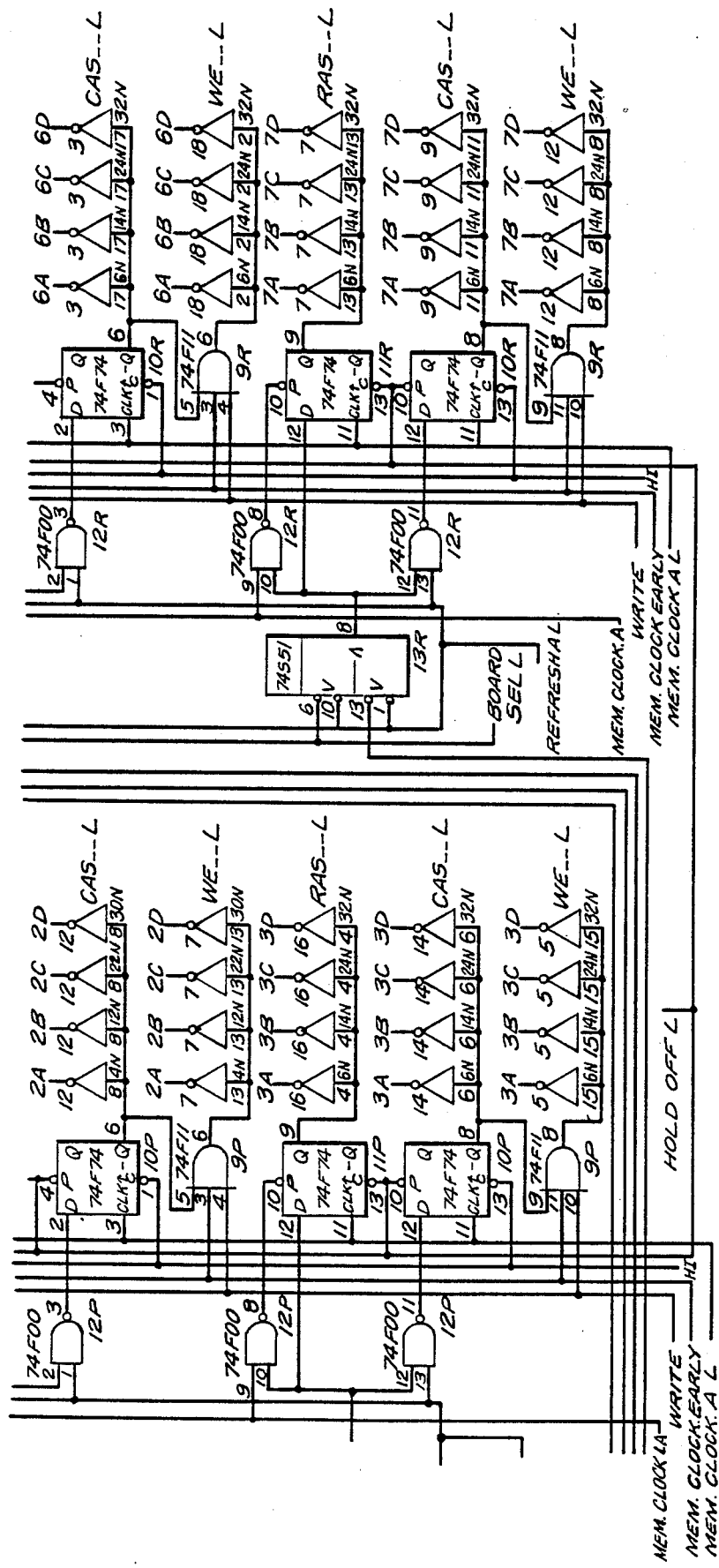
Figure 21:
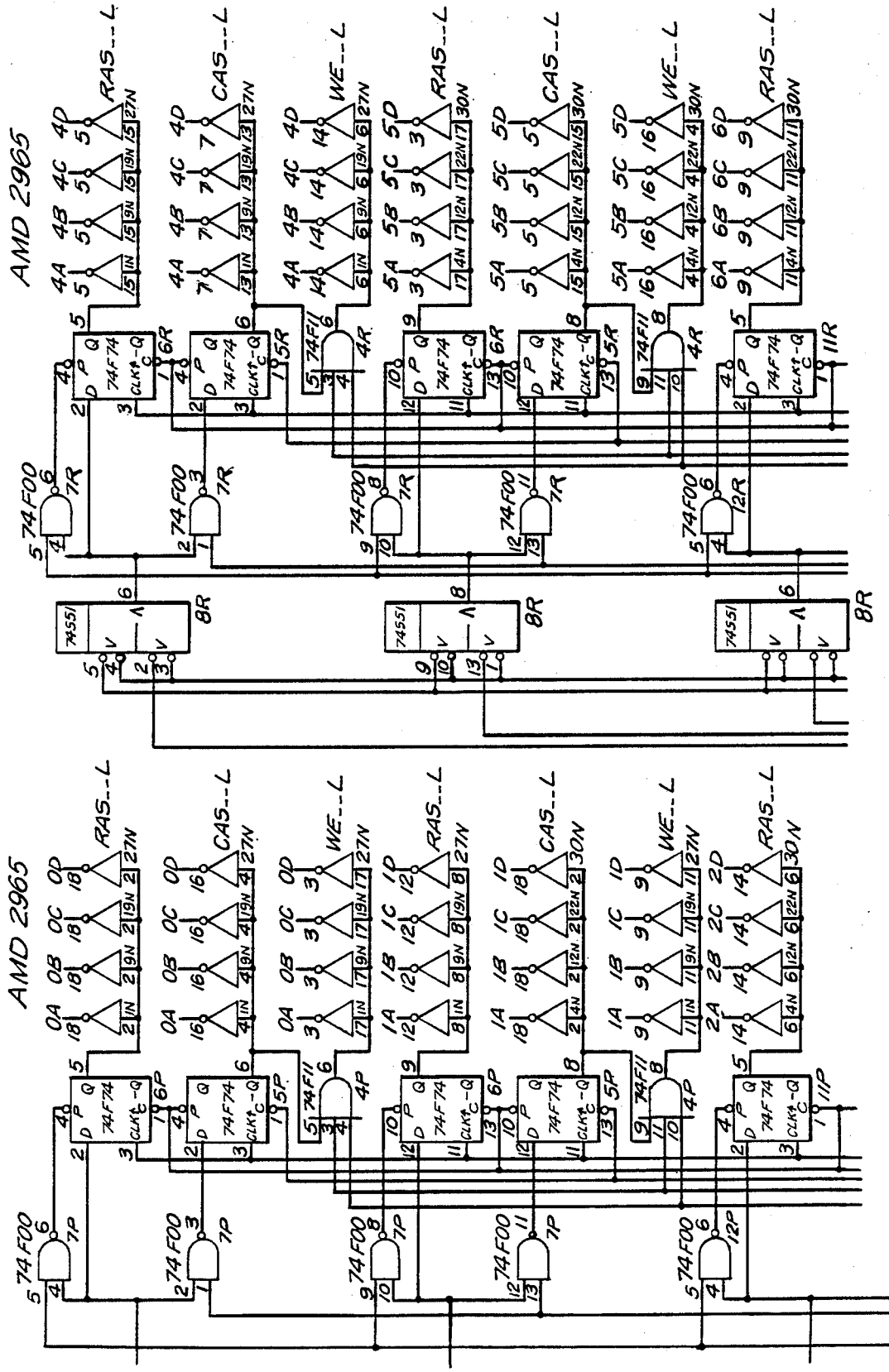
Figure 22:
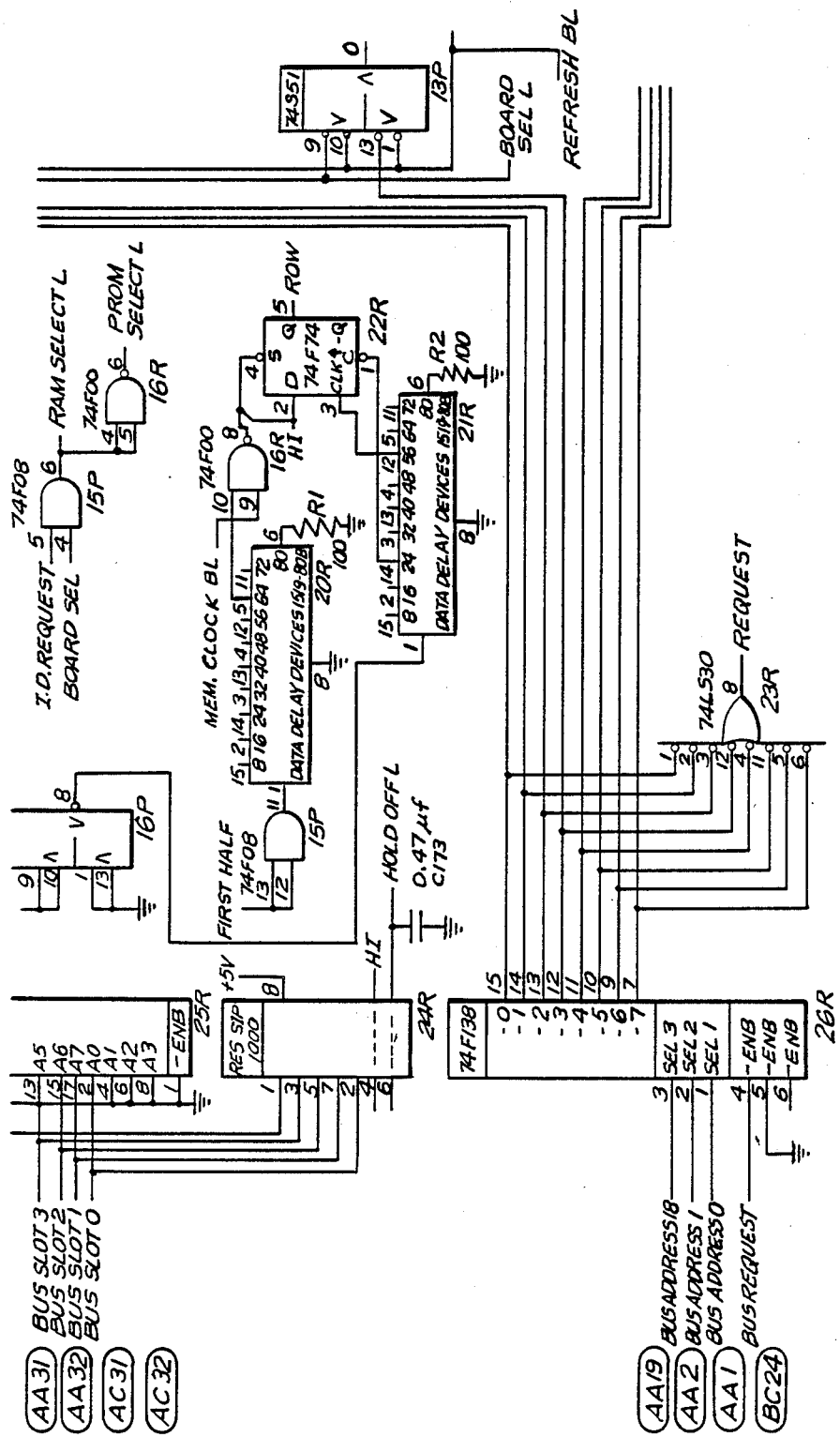
Figure 23:
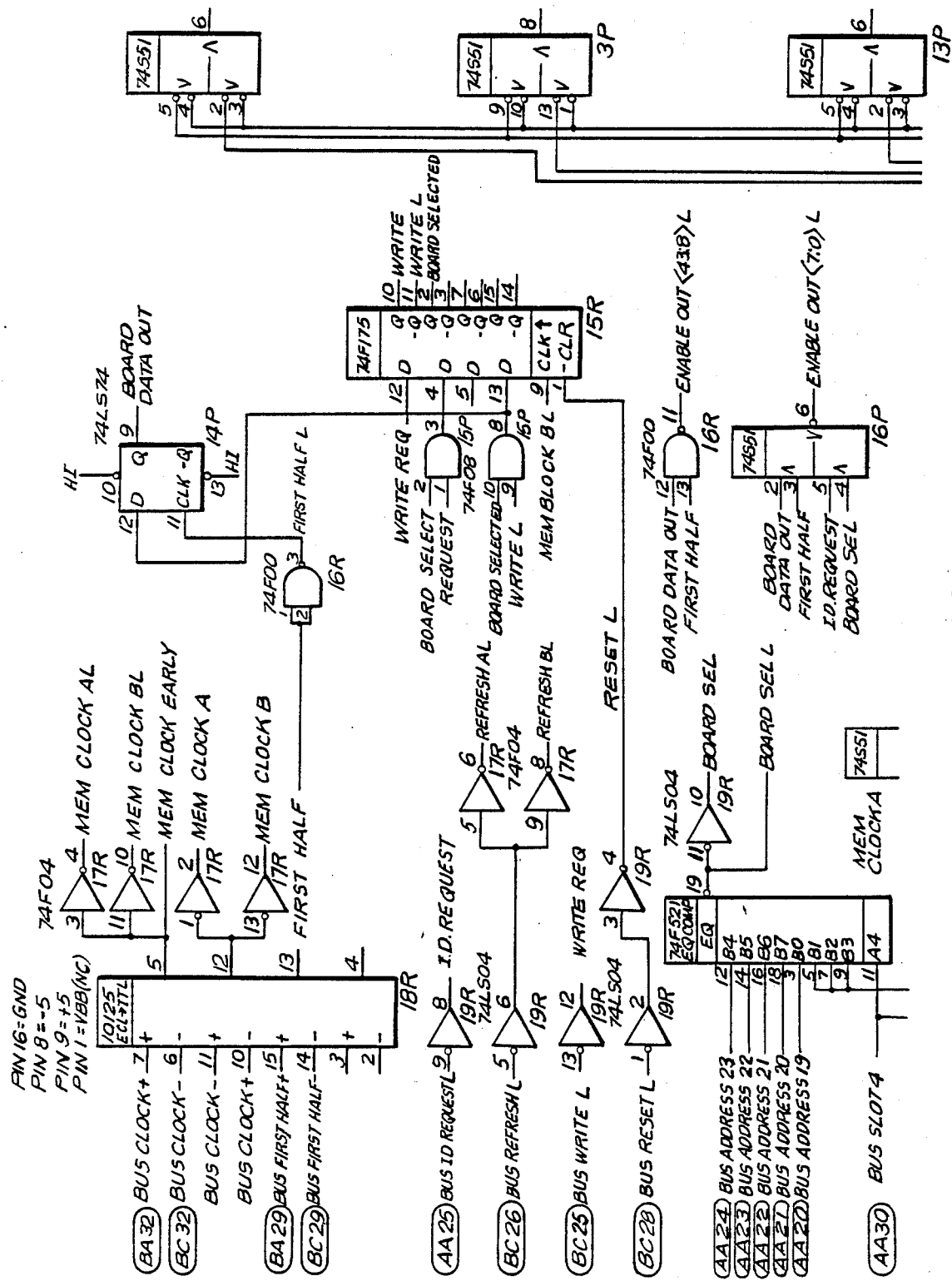

FIG. 4 shows the data output buffers of the memory, and FIGS. 15 and 16 illustrate the tristate data drivers. FIGS. 17-18 illustrate the address drivers, FIGS. 19 is the address buffer registers and decoders and FIGS. 20-23 illustrate the memory control signal circuitry.

The combination of the synchronous pipeline memory, microtasking, micro DMA and centrallized ECC is believed to be particularly advantageous in that it eliminates a DMA for each microdevice that wants to issue a request to the memory and it also eliminates the use of ECC circuitry on each board of the system.

The synchronous pipeline memory, microtask and micro DNA features combine to enable micro sequencing between an external peripheral and the memory of the system via the FEP with the error correction taking place within the active cycle of the bus timing whereby the microdevice which is requesting data from the memory is not impacted. This combination of features allows an external I/O device to issue a task request and for the microtasking feature of the system to effect the data transfer in a block mode.

It will be appreciated that the instant specification and claims are set forth by way of illustration and not limitation, and that various modifications and changes may be made without departing from the spirit and scope of the present invention.

What is claimed is:

1. In a data processor programmable in a symbolic processing language and having a main memory wherein each location has a multi-bit actual address comprising a page nummber and an offset number, central processing means for operating on data and for storing data in the main memory with an associated virtual address comprising a virtual page number and an offset number and means for converting the virtual address to the actual address, the improvement wherein the converting means comprises: a first cache memory having a table of actual addresses for a plurality of virtual addresses, means for performing a first hash function on a given virtual page number to reduce the number of bits thereof to form a map address corresponding to the hashed virtual page number; at least one addressable map converter for storing the actual page number and the given virtual page number corresponding thereto in the map address corresponding to the hashed virtual page number; means for indicating that a given virtul address is not in the first cache memory; means responsive to an indication that a given virtual addresses is not in the first cache memory for hashing the given virtual page number and applying same to the at least one addressable map converter; means for comparing the given virtual page number with the virtual page number from the at least one addressable map converter whereby a favorable comparison indicates that the stored actual page number is in the at least one addressable map converter; and means for applying the accessed actual page number and the original offset number to the main memory when there is a favorable comparison to thereby access the location corresponding to said access actual page number and on final offset number.

2. The processor according to claim 1, wherein the converter means further comprises at least two addressable map converters each receptive of the map address corresponding to the first hashed virtual page number.

3. The process according to claim 1 or 2, wherein the main memory has means defining a secondary table for addresses, and wherein the converting means further comprising means responsive to the failure to locate the physical address in the at least one addressable map converter for producing a microcode controlled look-up of the address in the secondary table.

4. In a data processor programmable in a symbolic programming language and having a main memory for storing data objects each having an identifying type field and central processing means for operating on at least one data object from the main memory, wherein the improvement comprises: means for effecting parallel data type checking wherein the data object type field is a tag field indicating a data type and is always the same bits and comprising means for separating the tag field bits from remaining bits of each data object prior to the operation thereon by the central processing means; means for checking the separated tag field bits with respect to and in parallel with the operation on the remaining bits of the associated data object and for generating new tag field bits in accordance with the operation in parallel with the operation on the remaining data object bits, whereby data type checks by the checking means are carried out during the operation of the central processing means; and means for combining the new tag field bits with the results of the operation to obtain a new data object.

5. The processor according to claim 4, further comprising means for interrupting the operation of the central processing means in response to the generation of a predetermined tag field bits, means for altering the predetermined tag field to another data type, and means for resuming operation upon the alteration thereof.

6. The processor according to claim 4, wherein the central processing means includes means defining a predetermined timing cycle, and wherein the central processing means, separating means, checking means and combining means obtain a new data object within the same predetermined timing cycle.

* * * * *